(12) United States Patent
Shimezawa et al.

(10) Patent No.: US 12,052,744 B2
(45) Date of Patent: Jul. 30, 2024

(54) COMMUNICATIONS DEVICE, INFRASTRUCTURE EQUIPMENT AND METHODS FOR ADDRESSING ACKNOWLEDGEMENT COLLISIONS

(71) Applicant: Sony Group Corporation, Tokyo (JP)

(72) Inventors: Kazuyuki Shimezawa, Basingstoke (GB); Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 416 days.

(21) Appl. No.: 17/431,179

(22) PCT Filed: Mar. 12, 2020

(86) PCT No.: PCT/EP2020/056646
§ 371 (c)(1),
(2) Date: Aug. 16, 2021

(87) PCT Pub. No.: WO2020/200685
PCT Pub. Date: Oct. 8, 2020

(65) Prior Publication Data
US 2022/0150905 A1    May 12, 2022

(30) Foreign Application Priority Data

Apr. 1, 2019  (EP) ..................................... 19166662

(51) Int. Cl.
*H04W 72/56*   (2023.01)
*H04L 5/00*    (2006.01)
(Continued)

(52) U.S. Cl.
CPC .......... *H04W 72/56* (2023.01); *H04L 5/0053* (2013.01); *H04W 72/02* (2013.01); *H04W 72/0446* (2013.01); *H04W 72/23* (2023.01)

(58) Field of Classification Search
CPC . H04W 72/56; H04W 72/02; H04W 72/0446; H04W 72/23; H04L 5/0053; H04L 1/1861; H04L 1/1896; H04L 1/1854
See application file for complete search history.

(56) References Cited

U.S. PATENT DOCUMENTS

| | | | |
|---|---|---|---|
| 2018/0255532 A1* | 9/2018 | Li | ......................... H04W 88/04 |
| 2018/0279291 A1 | 9/2018 | Tiirola | |
| 2018/0323909 A1 | 11/2018 | Ying | |

FOREIGN PATENT DOCUMENTS

| | | |
|---|---|---|
| CN | 108633041 A | 10/2018 |
| CN | 109417525 A | 3/2019 |
| WO | 2019/032003 A1 | 2/2019 |

OTHER PUBLICATIONS

International Search Report and Written Opinion mailed on Jun. 15, 2020, received for PCT Application PCT/EP2020/056646, Filed on Mar. 12, 2020, 15 pages.

(Continued)

*Primary Examiner* — Kiet Tang
(74) *Attorney, Agent, or Firm* — XSENSUS LLP

(57) ABSTRACT

A method includes receiving one or more first downlink data blocks and one or more second downlink data blocks, for each of the one or more first downlink data blocks and one or more second downlink data blocks determining an acknowledgement status, the acknowledgement status indicating whether the downlink data block was correctly received or not received correctly (ACK/NACK), receiving an indication of first uplink communications resources allocated for transmitting first acknowledgement information including the acknowledgement status for the one or more (Continued)

first downlink data blocks, determining that the first uplink communications resources are allocated for the transmission of acknowledgement information generated in accordance with a first codebook, the first codebook for generating acknowledgement information associated with the one or more first downlink data blocks, and receiving an indication of second uplink communications resources allocated for transmitting second acknowledgement information including the acknowledgement status for the second downlink data blocks.

20 Claims, 10 Drawing Sheets

(51) Int. Cl.
    *H04W 72/02*     (2009.01)
    *H04W 72/0446*     (2023.01)
    *H04W 72/23*     (2023.01)

(56) References Cited

OTHER PUBLICATIONS

China Telecom, "UCI Enhancements for URLLC", 3GPP TSG RAN WG1 #96bis, R1-1904907, Apr. 8-12, 2019, 2 pages.
Interdigital, Inc., "URLLC UCI Prioritization", 3GPP TSG RAN WG 1 Meeting #94bis, R1-1811114, Oct. 8-12, 2018, 2 pages.
Nokia et al., "Summary of Friday Offline Discussion on UL/DL Intra-UE Prioritization/Multiplexing" 3GPP TSG-RAN WG1 #96, R1-1903818, Feb. 25-Mar. 1, 2019, 29 pages.
Nokia et al., "On UCI Enhancements for URLLC", 3GPP TSG RAN WG1 Ah Hoc Meeting 1901, R1-1900928, Jan. 21-25, 2019, 13 pages.
3GPP, "Study on NR Industrial Internet of Things (IoT); (Release 16)" 3GPP TR 38.825 V1.0.0, Mar. 2019, pp. 1-32.
3GPP, "Study on Physical Layer Enhancements for NR Ultra-Reliable and Low Latency Case (URLLC) (Release 16)" 3GPP TR 38.824 V1.0.0, Nov. 2018, pp. 1-22.
3GPP, "LS on Intra-UE Prioritization/Multiplexing", 3GPP TSG-RAN WG2 Meeting #104, R2-1818795, Nov. 12-16, 2018, 2 pages.
3GPP, "NR; Physical Layer Procedures for Data (Release 15)" 3GPP TS 38.214 V15.2.0, Jun. 2018, pp. 1-94.
Holma et al., "LTE for UMTS OFDMA and SC-FDMA Based Radio Access", John Wiley & Sons, 2009, pp. 25-27.
3GPP, "NR; NR and NG-RAN Overall Description; Stage 2 (Release 15)" 3GPP TS 38.300 V15.4.0, Dec. 2018, pp. 1-97.
Nokia et al., "Revised SID: Study on NR Industrial Internet of Things (IoT)", 3GPP TSG RAN meeting #81 RP-182090, Sep. 10-13, 2018, 5 pages.
3GPP, "NR; Medium Access Control (MAC) Protocol Specification (Release 15)", 3GPP TS 38.321 V15.3.0, Sep. 2018, pp. 1-76.
Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.
Nokia, "CBG-based transmission with pre-emption indication", 3GPP tsg_ran WG1_RL1, TSGR1, R1-1708379 May 5, 2017, 3 pgs.

* cited by examiner

COMMUNICATIONS DEVICE, INFRASTRUCTURE EQUIPMENT AND METHODS FOR ADDRESSING ACKNOWLEDGEMENT COLLISIONS

CROSS-REFERENCE TO RELATED APPLICATIONS

The present application is based on PCT filing PCT/EP2020/056646, filed Mar. 12, 2020, which claims the priority of European patent application no. EP 19166662.7, filed Apr. 1, 2019, the contents of each are hereby incorporated by reference.

BACKGROUND

Field

The present disclosure relates to communications devices, infrastructure equipment and methods for the reception of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
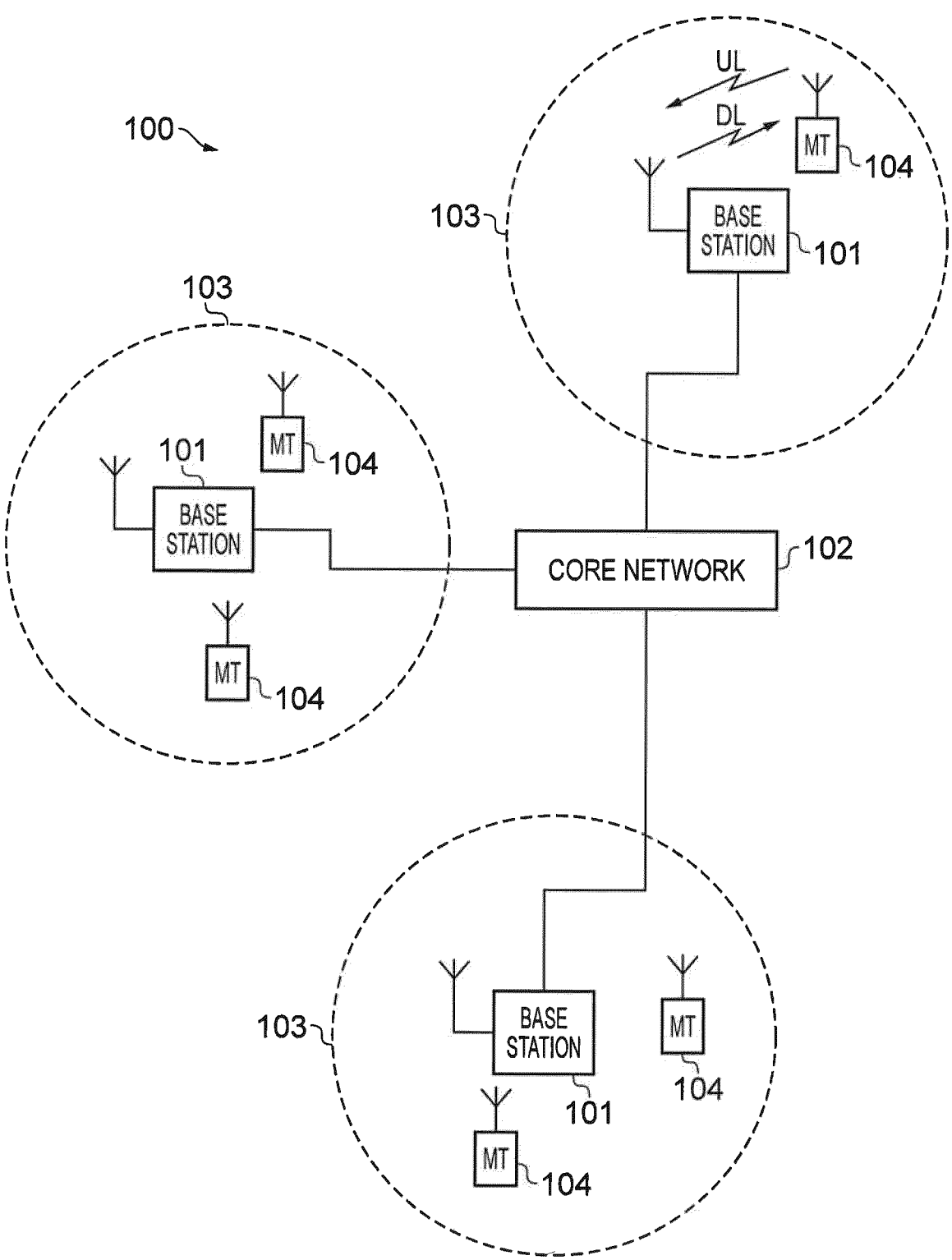
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
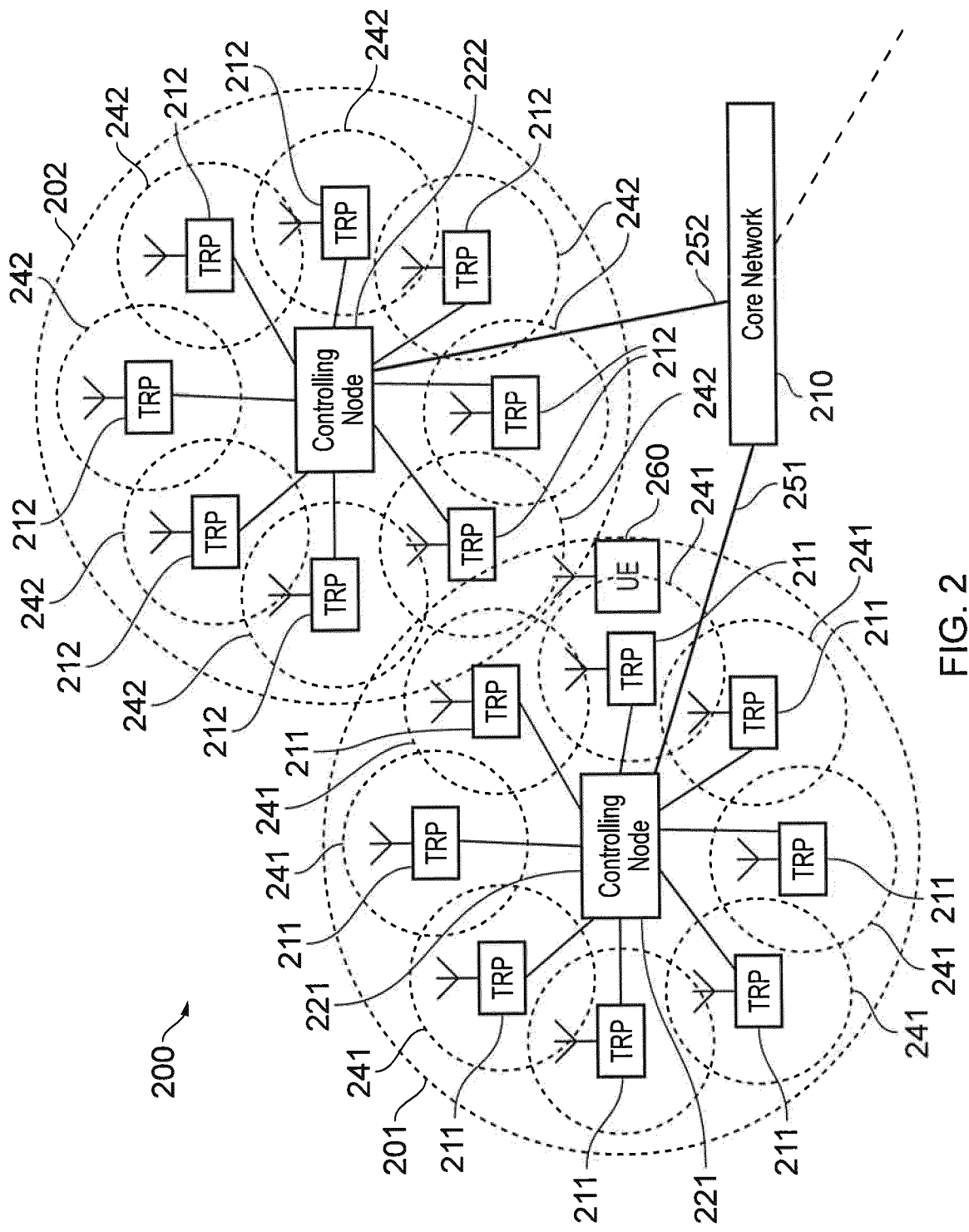
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
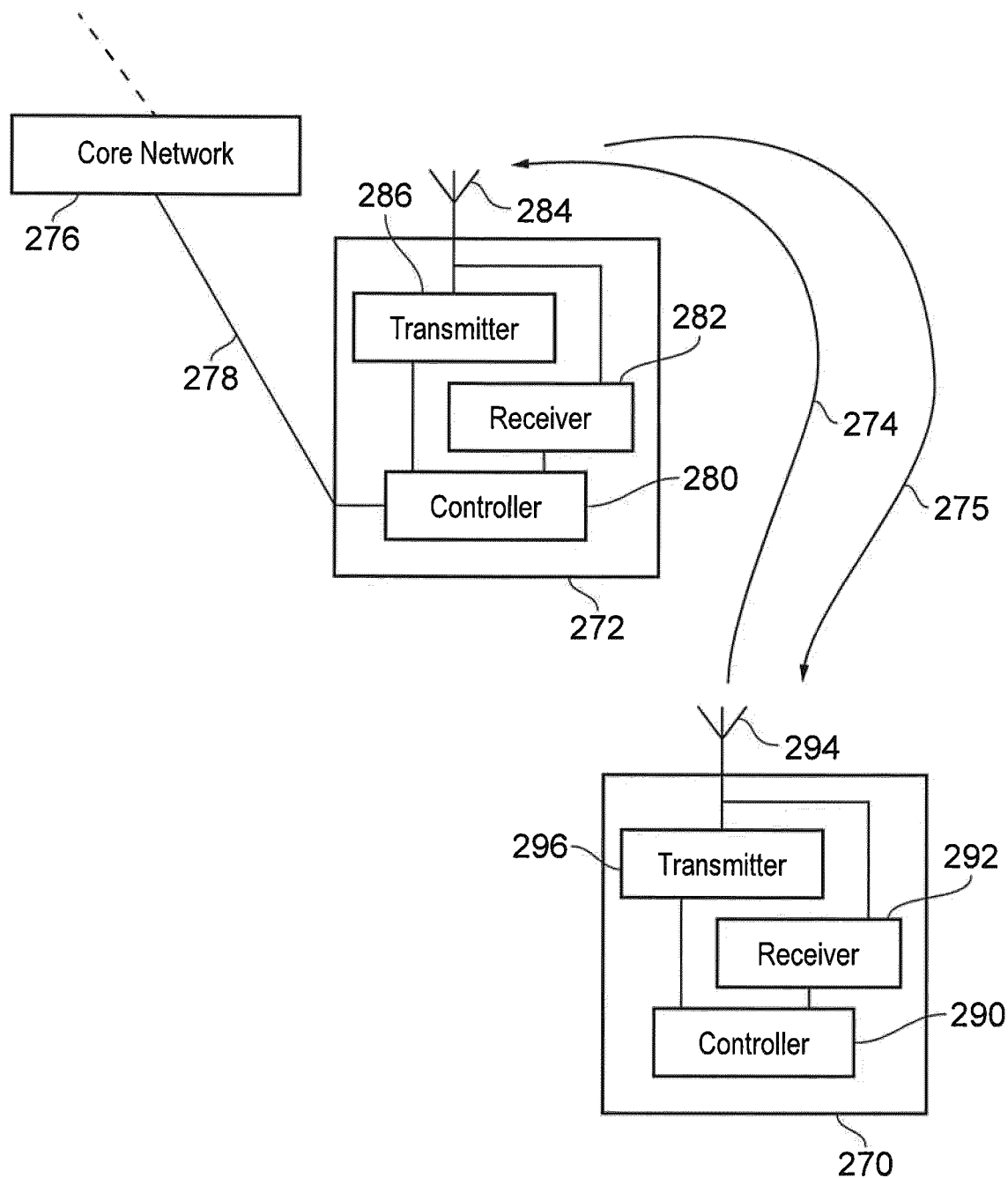
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [5] services are for a reliability of $1$-$10^{-5}$ (99.999%) or higher for one transmission of a 32 byte packet with a user plane latency of 1 ms [3]. In some scenarios, there may be a requirement for a reliability of $1$-$10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [9].

In order to permit a communications device to transmit data associated with multiple traffic classes in a timely manner, multiple configured grants/semi-persistent scheduling (SPS) grants may be required in order to provide more flexibility while avoiding excessive dynamic downlink control signalling.

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC. Furthermore, one of the requirements for communicating uplink data from a UE is to manage intra-UE packet prioritization and multiplexing. This is a requirement to prioritise the communication of uplink data and control packets from different categories of traffic within the UE. A better appreciation of the generation of uplink data of different logical types will be provided in the following section.

Logical Channels

The transmission of data by a communications device or an infrastructure equipment may be required to support different services, by communicating different types of information and control information. Such data is received from higher layers at a medium access control (MAC) layer. Different types of information are therefore categorized into different Logical Channels. For example MIB or SIB information and user data information are different types of information and therefore they belong to different Logical Channels, namely Broadcast Control Channel (BCCH) and Dedicated Traffic Channel (DTCH) respectively.

Figure 4:
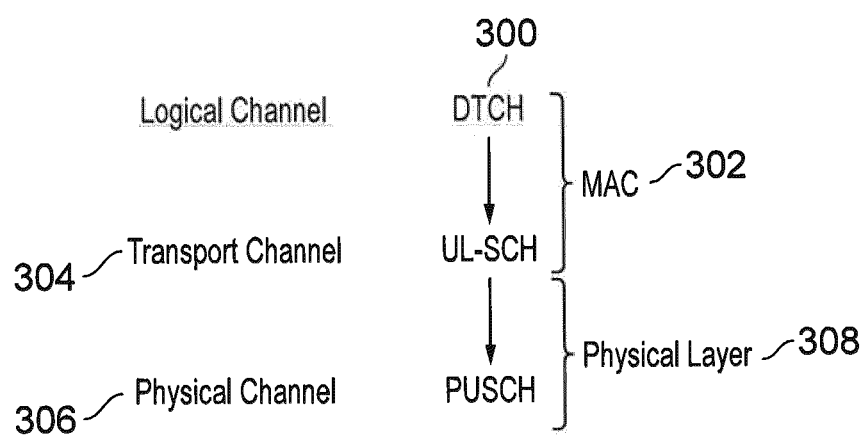
FIG. 4 is a schematic illustration of the processing of data for uplink transmission by a medium access control (MAC) layer and a Physical layer of a communications device or infrastructure equipment, which may be in accordance with embodiments of the present disclosure.

An illustration is shown in FIG. 4, in which a MAC layer 302 at the UE 270 maps a Logical Channel DTCH 300 to a Transport Channel comprising an Uplink Shared Channel (UL-SCH) 304. As shown in FIG. 4, The UL-SCH Transport Channel 304 is then mapped to a Physical Uplink Shared Channel (PUSCH) 306 within a physical layer 308. The different types of Logical Channels, e.g. BCCH, DTCH, DCCH, have different requirements or priorities and to distinguish them, they are each assigned a different Logical Channel Identity (LCID). Even among data traffic (DTCH) there can be different priorities or requirements and hence multiple DTCH having different priorities may be categorized into different Logical Channels, each having a respective Logical Channel Identity (LCID). Each LCID can be independently configured by the network.

Corresponding MAC layers, transport channels and physical channels may be arranged for downlink data transmitted by the infrastructure equipment 101 to the UE 270 or communications device 104.

Hybrid Automatic Repeat Request (HARQ) feedback

Data may be transmitted by the communications device 104, using uplink communications resources, or by the infrastructure equipment 101, using downlink communications resources. Data may be transmitted within MAC transport blocks (TB). Each MAC TB is constructed at the MAC protocol layer (such as, in the UE 270, at the MAC protocol layer 302).

Each MAC TB may comprise, or be transmitted together with error check bits, which permit the receiver of the MAC TB to determine whether the MAC TB has been received and decoded without error (i.e. 'correctly' or 'successfully' received).

Improved data transmission reliability may be realised by the use of acknowledgement (ACK) information transmitted by the recipient of the data to the transmitter. The ACK information may comprise an indication of an acknowledgement status for one or more portions of data. The acknowledgement status for a portion of data (such as data received in a given MAC TB) may indicate whether that data has/have been received in error, or has not been received at all.

In response to receiving the ACK information, the data transmitter may retransmit data which has not been successfully received by the receiver. This process may be repeated as many times as necessary until all the data has been successfully conveyed to the intended recipient.

A HARQ process may operate 'synchronously' or 'asynchronously'. According to a synchronous HARQ process, the relative timing of data transmission and the transmission of corresponding ACK information is fixed according to predetermined parameters for the HARQ process.

A communications device may operate multiple HARQ processes in parallel, and these may be offset in time. For example, a data block associated with one HARQ process may be being received from the infrastructure equipment, a further data block may be being decoded to determine whether it has been received without error or not, and yet in respect of a further data block, acknowledgement information may have been recently transmitted to the infrastructure equipment and the communications device may be expecting to receive a retransmission of that further data block.

Embodiments of the present technique may find application in scenarios where the HARQ processes are synchronous or asynchronous.

In accordance with some conventional HARQ techniques, a retransmission of data may be encoded in a different manner to that used for a previous transmission of the same data. Additionally or alternatively, a receiver may store information (such as 'soft bits' generated as part of a decoding process) corresponding to an earlier transmission of the same data, and may use this information to improve the probability of successfully decoding the data after the subsequent retransmission.

In response to receiving data successfully or unsuccessfully (i.e. where it is determined that one or more errors are present) the corresponding acknowledgement status for that data may be updated. When ACK information is subsequently generated for transmission, that ACK information may take into account the updated acknowledgement status for that data.

According to various proposals, ACK information may be generated and transmitted independently in respect of data associated with different services (or service types) and/or logical channels. For example, ACK information relating to URLLC data may be generated and transmitted independently of ACK information relating to eMBB data. In particular, uplink communications resources for the transmission of ACK data associated with different service types may be allocated independently.

A HARQ procedure may operate independently of the logical channels associated with the data being transmitted and acknowledged. For example, one transport block may carry data associated with multiple logical channels. A single acknowledgement status (ACK/NACK) may be determined for such a transport block.

Uplink communications resources for the transmission of acknowledgement information may occur less frequently than the transmission of downlink data. Therefore, there may arise a need for ACK information transmitted using a given instance of uplink communications resources to convey the acknowledgement status corresponding to multiple downlink data transmissions and their respective MAC TBs.

Uplink communications resources for the transmission of acknowledgement information may be explicitly allocated by the infrastructure equipment. For example, downlink control information (DCI) indicating downlink communications resources for the transmission of downlink data may additionally comprise an indication of allocated uplink communications resources for the transmission of acknowledgement information.

Additionally or alternatively, the communications device 104 may determine uplink communications resources for transmitting acknowledgement information implicitly based on allocated downlink communications resources. Such uplink communications resources may be said to be 'implicitly' allocated.

The inventors of the present disclosure have identified that such uplink communications resources may conflict, such that the communications device 104 is unable to transmit ACK information using both of two uplink communications resource allocations. There is thus a need to provide techniques by which the communications device 104 efficiently transmits ACK information in the event of such collisions, recognising that the ACK information that would have been transmitted using the two uplink communications resources (were there no collision) may have been different and in particular may have related to data associated with different services and/or having different quality of service requirements.

According to embodiments of the present disclosure, there is provided a method of receiving data by a communications device in a wireless communications network, the method comprising receiving one or more first downlink data blocks and one or more second downlink data blocks, for each of the one or more first downlink data blocks and one or more second downlink data blocks determining an acknowledgement status, the acknowledgement status indicating whether the downlink data block was correctly received or not received correctly (ACK/NACK), receiving an indication of first uplink communications resources allocated for transmitting first acknowledgement information including the acknowledgement status for the one or more first downlink data blocks, determining that the first uplink communications resources are allocated for the transmission of acknowledgement information generated in accordance with a first codebook, the first codebook for generating acknowledgement information associated with the one or more first downlink data blocks, receiving an indication of second uplink communications resources allocated for transmitting second acknowledgement information including the acknowledgement status for the one or more second downlink data blocks, determining that the second uplink communications resources are allocated for the transmission of acknowledgement information generated in accordance with a second codebook, the second codebook for generating acknowledgement information associated with the one or more second data blocks, determining that the communications device is not capable of transmitting acknowledgement information using the first uplink communications resources and acknowledgement information using the second uplink communications resources, determining that a priority for transmitting acknowledgement information using the second communications resources is higher than a priority for transmitting acknowledgement information using the first communications resources, and in response to determining that the priority for transmitting acknowledgement information using the second communications resources is higher than the priority for transmitting acknowledgement information using the first communications resources, transmitting acknowledgement information using the second uplink communications resources, the transmitted acknowledgement information comprising an acknowledgement status indication representing the acknowledgement status of the one or more second downlink data blocks, and not transmitting acknowledgement information using the first communications resources.

In some embodiments of the present technique, acknowledgement information may be selected for transmission in accordance with predetermined prioritisation rules reflecting quality of service requirements for types of data having different quality of service requirements. Embodiments of the present technique provide acknowledgement information to an infrastructure equipment of a wireless communications network to permit the infrastructure equipment to schedule downlink data transmissions and retransmissions in accordance with quality of service requirements associated with the downlink data.

Figure 5:
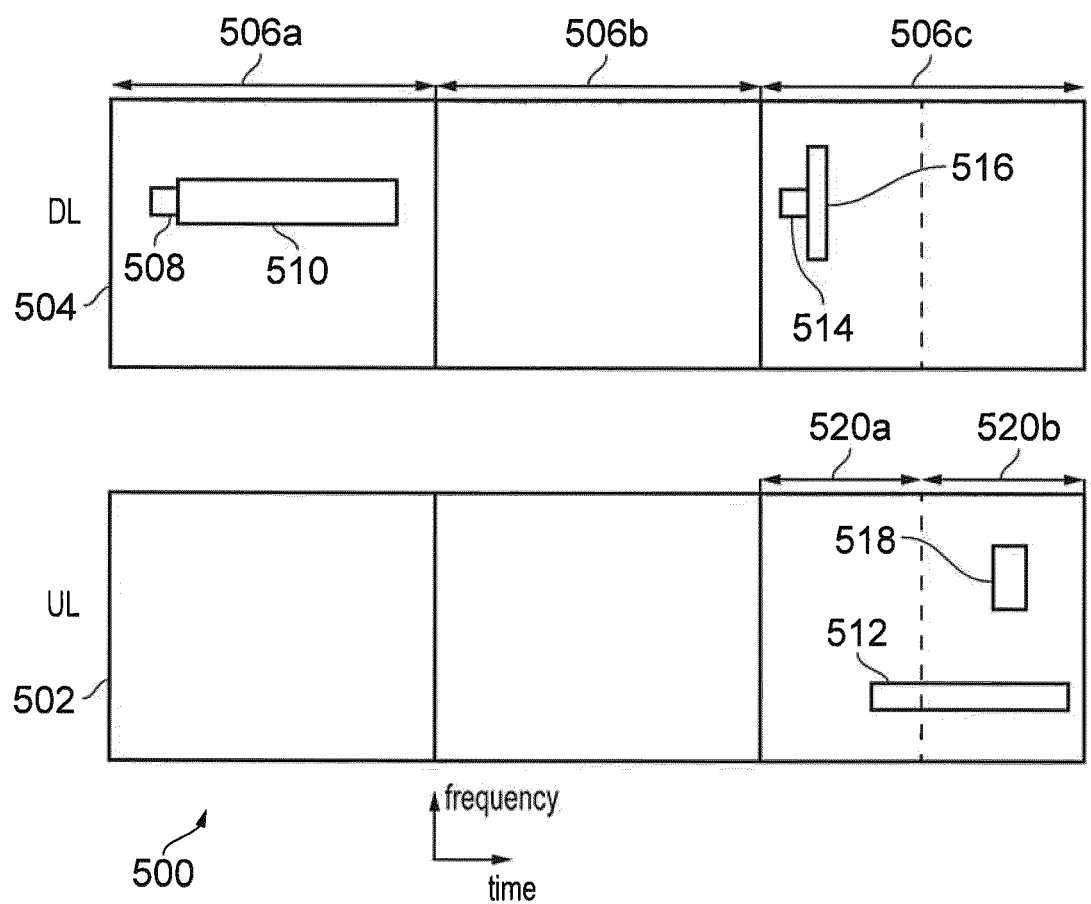
FIG. 5 illustrates transmissions and allocated communications resources in a scenario in which a collision between allocated uplink resources for the purpose of transmitting acknowledgement information may arise.

FIG. 5 illustrates transmissions in a scenario in which a collision between allocated uplink resources for the purpose of transmitting acknowledgement information may arise and will be used to explain various aspects and embodiments of the present technique.

FIG. 5 shows portions of a wireless access interface 500 provided by infrastructure equipment 101 in a wireless communications network. The wireless access interface 500 comprises uplink resources 502 and downlink resources 504. In the example of FIG. 5, the uplink resources 502 and the downlink resources 504 are separated in the frequency domain. Both the uplink resources 502 and the downlink resources 504 are sub-divided in to time units. In particular the wireless access interface 500 is divided into timeslots 506a, 506b and 506c.

Within the first timeslot 506a, the infrastructure equipment 101 transmits a first downlink control information (DCI) 508 using a physical downlink control channel (PDCCH). The first DCI 508 indicates first downlink communications resources 510 within the first timeslot 506a on the downlink, and in addition indicates first uplink communications resources 512 on the uplink 502 of the wireless access interface 500 within the third timeslot 506c. The first uplink resources 512 are allocated for the purpose of transmitting acknowledgement (ACK) information in respect of downlink data transmitted by the infrastructure equipment 101 to the communications device 104.

More particularly, the first uplink communications 512 may be provided for the purpose of transmitting acknowledgement information relating to a first service type, which may be for example the eMBB service type. Thus the communications device 104 is allocated first uplink communications resources 512 for transmitting acknowledgement information in respect of previously received downlink data associated with the first service type.

Using the first downlink resources 510, which may be on a physical downlink shared channel (PDSCH), the infrastructure equipment 101 transmits first downlink data which is associated with the first service type.

Subsequently, during the third timeslot 506c, the infrastructure equipment 101 transmits a second downlink control information (DCI) 514 using a PDCCH. The second downlink control information 514 indicates second downlink communications resources 516 for the transmission of downlink data associated with a second service type, which may be the URLLC service type. In addition the second DCI 514 indicates second uplink communications resources 518 during the third timeslot 506c.

As such the communications device 104 is provided with communications resources for transmitting acknowledgement information to indicate the acknowledgement status of downlink data of the second type such as that transmitted using the second downlink communications resources 516.

In the example of FIG. 5, the timeslots 506a, 506b, 506c are further sub-divided in time. For example, the third timeslot 506c is sub-divided in to a first subslot 520a and a second subslot 520b. As shown in FIG. 5 both the first uplink communications resources 512 and the second uplink communications resources 518 fall within the second subslot 520b. The second uplink communications resources 518 is allocated for the transmission, by the communications device 104, of acknowledgement information related to data of the second type.

The first uplink communications resources 512 and the second uplink communications resources 518 may each be allocated on respective physical uplink control channels (PUCCH). In the example of FIG. 5, the first uplink communications resources 512 and the second uplink communications resources 518 may be allocated explicitly i.e. by means of an indication within a respective downlink control information. In some embodiments, one or both of the first uplink communications resources 512 and the second uplink communications resources 518 may be allocated implicitly—i.e. the communications device 104 determines the allocated uplink communications resources without receiving an explicit indication of their allocation. For example, the communications device 104 may determine the location in the time and frequency domains of the allocated uplink communications resources based on which downlink communications resources are allocated or used for the transmission of downlink data to the communications device 104.

Each of the first uplink communications resources 512 and the second uplink communications resources 518 may permit the transmission of multiple bits of acknowledgment information. As such each of the first uplink communications resources 512 and the second uplink communications resources 518 may permit an indication of acknowledgment status associated with a plurality of downlink data blocks.

In accordance with embodiments of the present technique the communications device 104 may determine that it is unable to transmit acknowledgment information using both the first uplink communications resources 512 and the second uplink communications resources 518.

There is thus a need to resolve how the communications device 104 should behave in such circumstances in order to ensure that acknowledgement information in respect of the first and second service type data is transmitted in an appropriate and timely manner.

Figure 6:
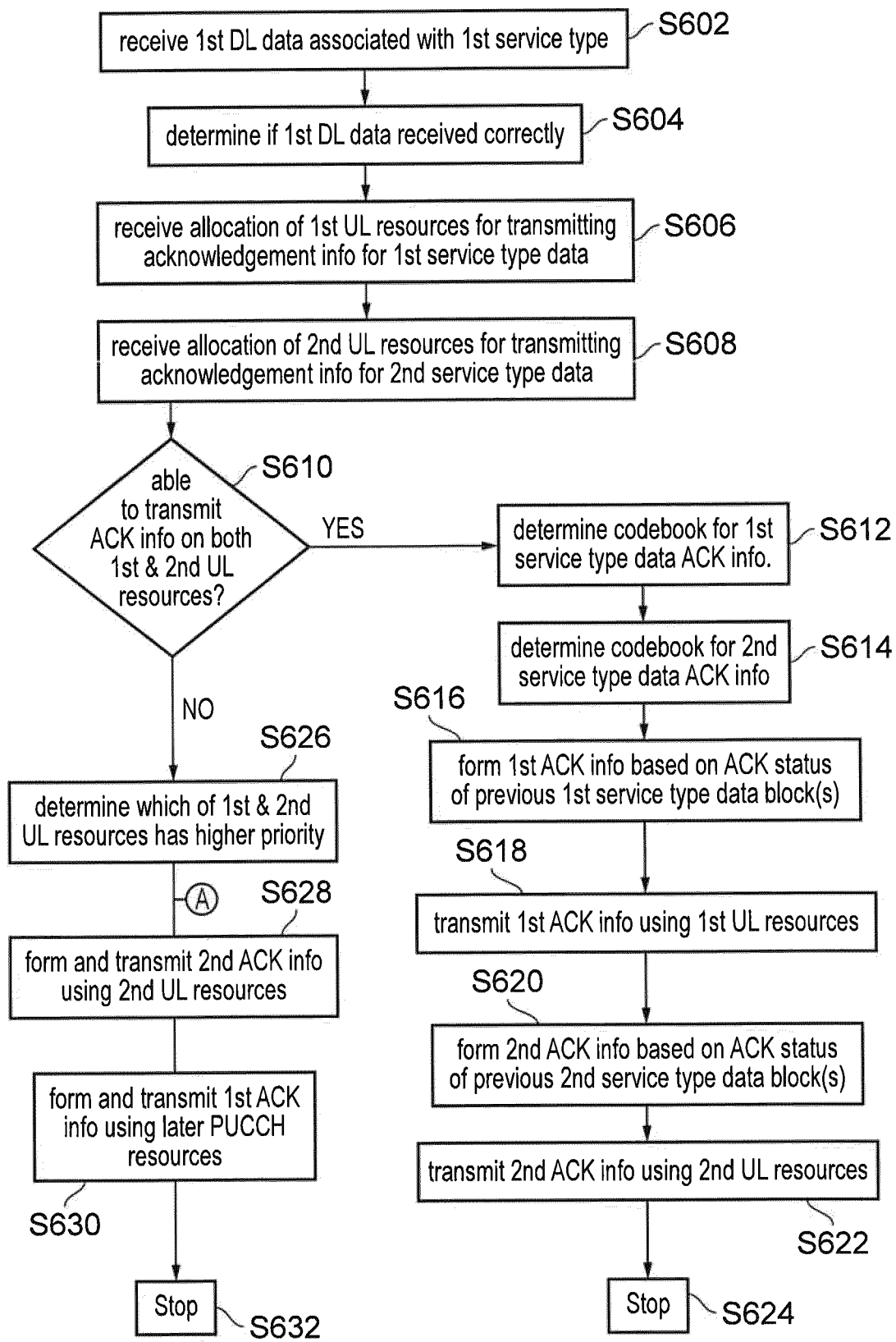
FIG. 6 illustrates a process for transmitting acknowledgement information in accordance with embodiments of the present technique.

FIG. 6 illustrates a process for transmitting acknowledgement information in accordance with embodiments of the present technique. FIG. 6 will be described with a reference to the scenario illustrated in FIG. 5 and described above, however it will be appreciated that the process of FIG. 6 is more generally applicable and may be used in other scenarios.

In the process of FIG. 6, the communications device 104 is configured to receive data associated with a first service, such as the eMBB service, and a second service, which may be for example the URLLC service.

The process of FIG. 6 starts at step S602, in which the communications device 104 receives first downlink data associated with a first service. In the example of FIG. 5, the first downlink data may correspond to that received during the first downlink communications resources 510 during the first timeslot 506a. Additionally, the communications device 104 may receive downlink data associated with a second service type, such as that transmitted using second downlink communications resources 516.

The process continues with step S604, in which the communications device 104 determines if the first downlink data received during the first downlink communications resources 510 is received correctly. As part of this step, the communications device 104 may employ conventional decoding and error correcting techniques. The communications device 104 may evaluate an error checking code, for example a cyclic redundancy check code, to determine whether, after decoding, errors remain in the decoded data.

It will be appreciated that if the first downlink data is determined not to have been received correctly, then it is necessary for the communications device 104 to indicate this to the infrastructure equipment 101 in order to trigger a retransmission of the first downlink data. Even if the first downlink data is determined to have been received correctly, then it may be desirable for the communications device 104 to indicate this to the infrastructure equipment 101 in order to prevent subsequent 'pre-emptive' retransmissions (i.e. where data is retransmitted based on the absence of a positive acknowledgement indication).

Corresponding determinations may be made in respect of the received downlink data associated with the second service type.

The process continues at step S606 in which the communications device determines uplink communications resources allocated by the infrastructure equipment 101 for transmitting, by the communications device 104, ACK information in respect of data of the first service type. In the example of FIG. 5, the communications device 104 receives the first downlink control information 508 in the first timeslot 506a, comprising an indication indicating the allocated first uplink communications resources 512.

Subsequently, at step S608, the communications device 104 determines uplink communications resources allocated for transmitting acknowledgment information in respect of data associated with a second service type. Referring to the example shown in FIG. 5, in some embodiments, the determination may be based on receiving an indication of the uplink communications resources, such as an indication within or provided by the second DCI 514 received during the third timeslot 506c. The uplink communications resources for transmitting the acknowledgement information in respect of the data associated with the second service type may correspond to the second uplink communications resources 518 of FIG. 5.

At step S610, the communications device 104 determines whether it is able to transmit acknowledgement information using both the first uplink communications resources 512 allocated for the transmission of acknowledgement information relating to data of the first service type and the second uplink communications resources 518, allocated for the transmission of acknowledgement information relating to data of the second service type. In some embodiments, the communications device 104 may determine that it is unable to transmit acknowledgement information using both the first uplink communications resources 512 and the second uplink communications resources 518 if the uplink communications resources overlap in time. In some embodiments, the communications device 104 may determine that it is unable to transmit acknowledgement information using both the first uplink communications resources 512 and the second uplink communications resources 518 if the start times of the uplink communications resources do not permit the communications device 104 to generate, encode and modulate for transmission the respective ACK information to be transmitted on the first uplink communications resources 512 and the second uplink communications resources 518.

If it is determined that such transmissions are both possible, then control passes to step S612 in which the communications device 104 determines a first codebook for forming the acknowledgment information to be transmitted using the first uplink communications resources 512.

Similarly at step S614, the communications device 104 determines a second codebook for forming the acknowledgement information to be transmitted in respect of the second service type data.

A codebook, such as the first codebook and the second codebook, may comprise predetermined rules for generating ACK information for transmission to the infrastructure equipment 101 by the communications device 104. For example, a codebook may specify a number of bits of acknowledgement information to be included in each transmission of ACK information. The codebook may additionally or alternatively specify a number of data blocks, wherein a given instance of ACK information is to indicate the acknowledgement status of each of the specified number of data blocks. In some embodiments, a codebook may specify a time duration, wherein the ACK information is to comprise an indication of the acknowledgement status of each data block received during the time duration.

Each of the first codebook and the second codebook may be configured to ensure that the number of bits of acknowledgement information included within the ACK information is sufficient to indicate the acknowledgement status of each block for which the acknowledgement status is to be reported within the ACK information.

A codebook may be semi-static so that a number of bits within the ACK information is configured (for example by RRC configuration). According to a semi-static codebook, the number of bits of ACK information may be independent of the number of data blocks and/or PDSCH instances whose corresponding acknowledgement status is to be reported.

A codebook may be dynamic, so that the number of bits is determined for each transmission of ACK information. The codebook may be determined based on DCI, an in particular based on a PDSCH-to-HARQ feedback timing value and a time domain resource assignment field within the DCI. The codebook is based on actual PDSCH reception. To make sure the codebook is consistent between UE and gNB, a downlink assignment indicator (DAI) is informed to the UE via DCI. The DAI denotes the cumulative number or total number of PDSCH receptions, as is described in more detail below.

Each data service type may be associated with a different codebook. The association between a data service type and a codebook may be specified (for example in technical specifications documents) or may be configured by the infrastructure equipment 101, for example by means of RRC signalling.

At step S616, the communications device 104 forms first acknowledgement information based on the acknowledgement status of previous data blocks in accordance with the first codebook. The previous data blocks whose acknowledgement status is reported in the first acknowledgement information may comprise data associated with the first service type.

For example, referring to FIG. 5, the first acknowledgement information may comprise an indication as to whether the downlink data received during the first downlink communications resources 510 was received and decoded without error. The first acknowledgement information may additionally contain indications as to whether previously received downlink data associated with the first service type has been successfully received or not.

It will be appreciated that in some scenarios, the communications device 104 may be unable to determine that downlink data has been transmitted by the infrastructure equipment 101 to the communications device 104. However, various techniques are known to ensure that the indications within acknowledgment information correspond on a one to one basis with data which was transmitted by the infrastructure equipment 101 to the communications device 104, even if the communications device 104 was not in fact able to receive or even detect that data.

One example of such a technique is to associate each data block with a sequence number, which is transmitted together with the downlink data block. If the communications device 104 is able to receive and decode the data block including the sequence number, then it may accordingly update the acknowledgement status associated with that sequence number. For example, a block may be successfully received having a sequence number 2.

If the communications device 104 next receives a data block which it determines is associated with an out-of-sequence sequence number, for example, 4, then it determines that it failed to detect or receive successfully a data block associated with the intermediate sequence number(s). In this example, it accordingly sets the acknowledgement status associated with the sequence number 3 to indicate that the corresponding data block has not been successfully received.

In accordance with some conventional techniques, the sequence number may reset periodically or (if the sequence number is represented by a fixed number of bits) when the sequence number exceeds the maximum possible value that can be represented. In accordance with some conventional techniques, the sequence number may be referred to as a 'downlink assignment indicator' (DAI) and may be indicated in downlink control information which indicates downlink communications resources in which data is to be transmitted to the communications device.

In accordance with some conventional techniques, sequence numbers may be applied irrespective of the respective data service type. In some approaches, on the other hand, separate sequence numbering is used for each data service type. In some approaches, a single DCI may refer to both sequence numbers, for example, using different fields within the DCI to refer to each sequence. In some approaches only one sequence number can be included in a DCI, and thus separate DCIs are used to indicate the current value of each sequence.

At step S618, the communications device 104 transmits the first acknowledgment information using the first uplink communications resource 512.

At step S620, the communications device 104 forms the second acknowledgement information based on the acknowledgment status of one or more previous data blocks associated with the second service type in accordance with the second codebook, and at step S622, the communications device 104 transmits the second acknowledgement information using the second uplink communications resources 518.

The process then ends at step S624.

Returning to step S610, if it is determined that the communications device 104 is unable to transmit acknowledgement information using both the first uplink communications resources 512 and the second uplink communications resources 518, then control passes to step S626.

In step S626, the communications device 104 determines which of the first and second uplink communications resources 512, 518 has a higher priority; that is, with which uplink communications resources the communications device 104 will transmit acknowledgement information in the event that it cannot transmit using both first and second uplink communications resources. The determination of this is described in further detail below. However, in some embodiments this step may comprise determining which of the acknowledgement information associated with the first service type data and the second service type data is of higher priority, and/or may be based on a determination of respective priorities associated with codebooks to be used for the formation of acknowledgement information to be transmitted using the first and second uplink communications resources (such as those that would have been determined at steps S612 and S614).

In the following description it is assumed that the second codebook or the second uplink communications resources 518 has the higher priority. However it will be appreciated that the process description applies similarly if in fact it is determined that the first uplink communications resources 518 have the higher priority.

Control then passes to step S628, in which the communications device 104 forms and transmits second uplink acknowledgement information in respect of the second service type data using the second uplink communications resources 518. This step may broadly correspond to a combination of the steps S612, S616 and S618 described above. In other words, the communications device 104 may transmit using the second uplink communications resources 518 the acknowledgement information that would have been transmitted were there no conflict with the first uplink communications resources 512.

In accordance with some embodiments of the present technique, no transmission occurs using the first uplink communications resources 512.

In some embodiments the process ends following step S628. However in some embodiments the process continues with step S630, in which some or all of the first acknowledgement information which would otherwise have been transmitted using the first uplink communications resources 512, is transmitted subsequently using uplink communications resources on a physical uplink control channel.

In some embodiments, the first acknowledgement information is transmitted using subsequent uplink communications resources, which may be the next uplink communications resources allocated for the transmission of acknowledgement information relating to the first service type data.

In some embodiments the first acknowledgement information may be transmitted using the next occurring uplink communications resources which are allocated for the transmission of acknowledgement information, irrespective of the service type for which that uplink communications resources are allocated.

For example, referring to the example of FIG. 5, the acknowledgement information which would otherwise have been transmitted, were it not for the conflict with the second uplink communications resources 518, may be transmitted using subsequent uplink communications resources which are allocated for the purpose of transmitting acknowledgement information regarding the second service type data.

Subsequently at step S632, the process ends.

Figure 7:
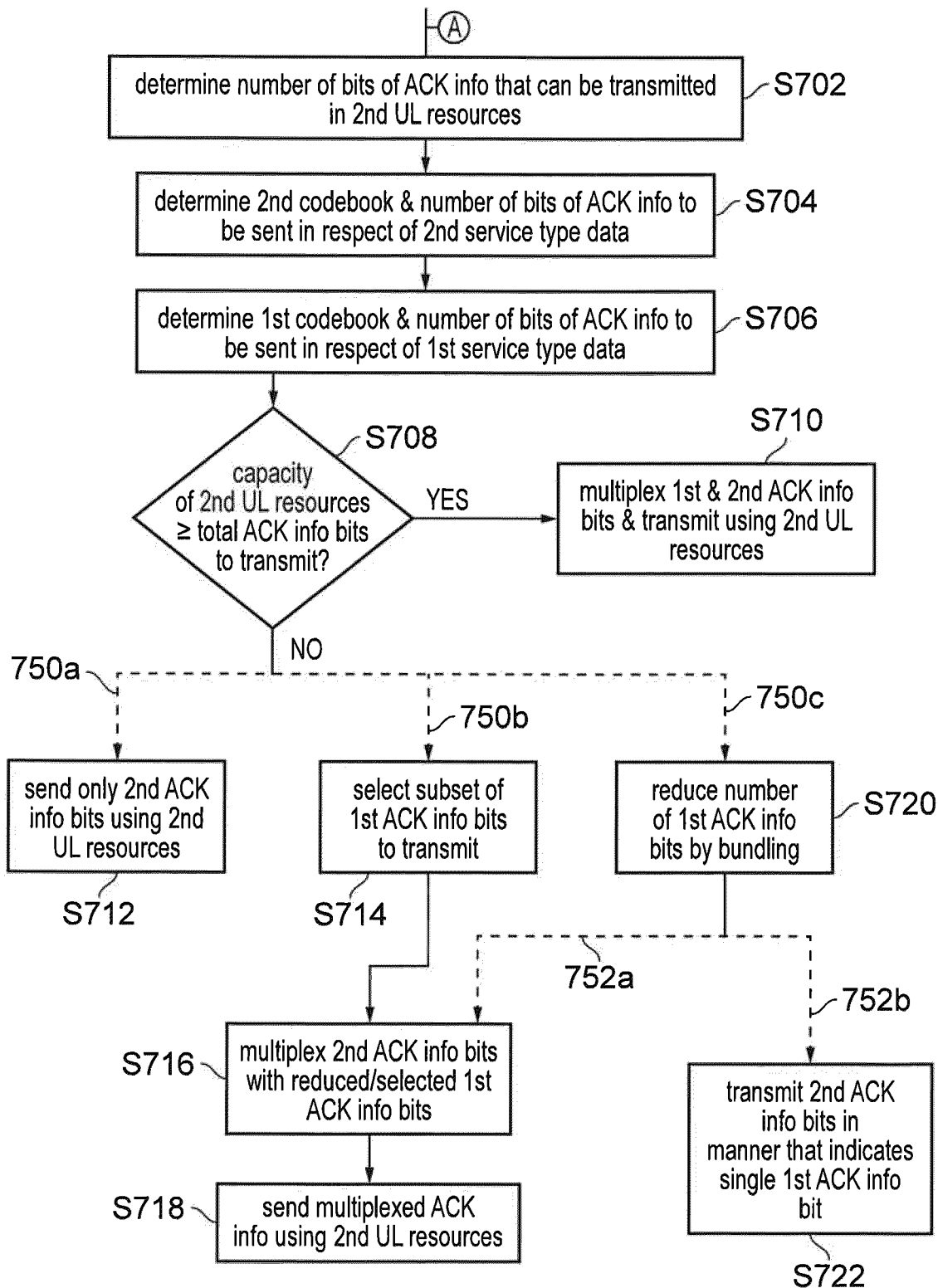
FIG. 7 illustrates a flowchart corresponding to a portion of a process for transmitting acknowledgement information in accordance with embodiments of the present technique.

FIG. 7 illustrates a flowchart corresponding to a portion of a process for transmitting acknowledgement information in accordance with embodiments of the present technique. The flowchart starts at step S702, which in some embodiments follows immediately from step S626 of the process illustrated in FIG. 6 and described above. That is, in some embodiments, instead of continuing with step S628, the process shown in FIG. 6 continues from step S626 directly to step S702.

In step S702, the communications device 104 determines a number of bits of acknowledgement information which can be transmitted using the second uplink communications resources 518. The determination of the number of bits may depend on one or more of

- a number of resource blocks allocated on the physical uplink control channel corresponding to the second uplink communications resources 518,
- a time duration (e.g. a number of OFDM symbols) which the second uplink communications resources 518 occupy,
- a value based on a format to be used when transmitting using the second uplink communications resources 518,
- a predetermined value based on modulation and coding scheme parameters applicable for the second uplink communications resources 518 and
- a predetermined code rate which may be determined based on previous RRC signalling received from the infrastructure equipment 101.

At step 704, the communications device 104 determines a number of bits of acknowledgement information which are to be transmitted in respect of the data of the second service type. As described above, the number of bits required to transmit acknowledgement information may depend on a determined codebook for the relevant acknowledgement information, a number of previous time periods for which the acknowledgement information is to cover, and/or number of previous downlink data blocks whose acknowledgement status is to be reported. As described above, based on techniques such as the use of the DAI, the communications device 104 may determine that the number of data blocks whose acknowledgement status is to be reported is greater than the number of data blocks that the communications device 104 actually detected (whether or not it successfully decoded them).

At step S706, the communications device 104 performs a similar process to that in step S704, in respect of acknowledgement information expected to be transmitted using the first uplink communications resources 512 in respect of data of the first service type.

At step S708, the communications device 104 determines whether the quantity of bits determined at step S702 which can be included and transmitted using the second uplink communications resources 518 is greater than or equal to the sum of the bits determined at step S704 and the number of bits determined at step S706. In other words, the communications device 104 determines whether it is possible to transmit, using only the second uplink communications resources 518, the expected acknowledgement information in respect of data of both the first and second service types.

If the capacity of the second uplink communications resources 518 is sufficient to transmit all of the expected acknowledgement information, then control passes to step S710, and the expected acknowledgement information in respect of data of both the first and second types is formed into a block of acknowledgement information which is transmitted using only the second uplink communications resources 518. No transmission using the first uplink communications resources 512 takes place, and the process ends.

If at step S708 it is determined that the capacity of the second uplink communications resources 518 is insufficient to transmit the expected acknowledgement information in respect of both the first and second data service types, then in some embodiments as shown by the dotted line S750a, control passes to step S712.

In step S712 the communications device 104 uses the second uplink communications resources 518 to transmit only acknowledgement information related to data of the second service type. In some embodiments therefore step S712 may correspond broadly to step S628 of the process of FIG. 6 and described above.

Returning to step S708, if the outcome of that decision is that the capacity of the second uplink communications resources 518 is insufficient, then in some embodiments, control passes to step S714 as indicated by the dotted line 750b.

In step S714, the communications device 104 selects a subset of the acknowledgement information associated with the first service type data to be transmitted using the second uplink communications resources 518. In some embodiments the selected subset of acknowledgement information may comprise acknowledgement information associated with the most recently received downlink data of the first service type. In some embodiments, the selected subset may be selected based on the size of the MAC TB of each respective downlink data transmission. For example, acknowledgement information related to large data blocks may be selected in preference to acknowledgement information associated with smaller data blocks. In some embodiments the selected subset may relate to only downlink data which was correctly received and decoded by the communications device 104.

Following step S714, control passes then to step S716. In step S716, the communications device 104 combines the acknowledgement information relating to the second service type (being the higher priority service type identified at step S626) with the selected subset of acknowledgement information related to the first service type data which was selected at step S714.

Subsequently at step S718, the communications device 104 transmits the combined acknowledgement information formed at step S716 using the second uplink communications resources 518. The first uplink communications resources 512 are not used for transmission.

In yet further embodiments of the present technique, following a negative decision at step S708, then as indicated by the dotted line 750c, control may pass to step S720.

In step S720, the communications device 104 aggregates acknowledgement information relating to a plurality of previously received downlink data blocks of the first service type in order to reduce the total number of bits required to indicate acknowledgement information in respect of that data. For example in some embodiments the communications device 104 groups previously received data blocks of the first service type and, for each group, generates one bit of acknowledgement information.

In some embodiments that one bit may indicate either that all of the data blocks within that group were received and decoded correctly, or that one or more of the data blocks within that group was not received correctly. As such, if a '1' represents successful reception and '0' represents unsuccessful reception, each bit of the reduced set of acknowledgement information bits may comprise a logical AND of a plurality of bits of the original acknowledgement information.

Subsequently in some embodiments control passes from step S720 to step S716 as indicated by the dashed line 752a. In such embodiments the number of bits of reduced ACK information generated in step S720 is such that the second uplink communications resources 518 provide sufficient capacity to transmit both the ACK information bits determined at step S702 and the reduced ACK information bits generated at step S720. The reduction of bits at step S720 may therefore be based on a determination of the available capacity within the uplink communications resources, after the inclusion of the second ACK information identified at step S702. For example, the number of bits within each group may be adjusted accordingly.

In step S716, as described above, the acknowledgement information relating to data of the second service type is combined with the reduced number of bits of acknowledgement information formed at step S720, relating to data of the first service type.

In some other embodiments, control passes from step S720 to step S722 as indicated by the dashed line 752b. In such embodiments, at step S720, the number of bits of reduced data is equal to 1. For example, one bit of data formed at step S720 indicates either that all of the previously received data of the first service type within the scope of the first acknowledgement information identified at step S706 indicates that the respective data was correctly received and decoded, or that at least one such data block was received in error or was not received at all.

Thus at step S720, only one bit of acknowledgement information is generated in respect of the first service type data.

In such embodiments when control passes via the dashed line 752b to step S722, then at step S722, the acknowledgement information related to the second service type data is transmitted using the second uplink communications resources 518 but in a manner which indicates whether the single bit generated at step S720 in respect of the first service type data is a 0 or a 1.

In some embodiments a scrambling sequence applied to the PUCCH carrying the acknowledgement information relating to the second service type data is used to distinguish between the possible values of the single bit generated at step S720. For example a first predetermined scrambling sequence may be used in the case that the single bit is a 0, and a second predetermined scrambling sequence may be used in the case the single bit is a 1.

In such embodiments the infrastructure equipment 101 may blind detect for both possible predetermined scrambling sequences. In some embodiments, at step S722, the physical resources used to transmit the second acknowledgement information in respect of the second service type data may depend on the bit generated at step S720. For example if the bit generated at step S720 is a 0, then the second acknowledgement information is transmitted using uplink communications resources in a first physical resource block (PRB), otherwise if the bit generated at step S720 is a 1, then the second acknowledgement information is transmitted using a second PRB. Following step S722, the process ends.

In some embodiments, where steps S714 or S720 are used to reduce the amount of ACK information relating to the first service type, some or all of the omitted ACK information may be transmitted subsequently, for example in the manner described above in respect of step S630.

At step S626 of the process illustrated in FIG. 6 and described above, the communications device 104 determines which of the first and second uplink communications resources 512, 518 should be used, if the communications device 104 determines at step S610 that it is not capable of transmitting acknowledgement information using both.

In other words, the communications device 104 determines whether a priority for transmitting acknowledgement information using the second communications resources is higher than a priority for transmitting acknowledgement information using the first communications resources.

The determination may be based on one or more of the first uplink resources, the first codebook, the second uplink resources and the second codebook.

The following paragraphs describe examples of how this determination may be made, in accordance with embodiments of the present technique.

In some embodiments, the communications device 104 is configured, for example by means of RRC signalling, to associate each of the first and second codebooks to be used for forming ACK information for transmission using, respectively, the first and second uplink communications resources 512, 518 with a priority level. Accordingly, if the first codebook is associated with a higher priority than the second codebook, then the first uplink communications resources 512 have the higher priority, and vice versa.

In some embodiments, each service type (e.g. URLLC, eMBB) is associated with a particular codebook.

In some embodiments, each service type is associated with a priority. A relative priority of uplink communications resources is determined based on a relative priority of service type associated with the codebook to be used for transmitting ACK information using the respective uplink communications resources.

Referring for example to FIG. 5, the first uplink communications resources 512 may be allocated for the transmission of ACK information formed in accordance with a codebook associated with the eMBB service type, and the second uplink communications resources 518 may be allocated for the transmission of ACK information formed in accordance with a codebook associated with the URLLC service type. If the priority associated with the URLLC service type is higher than that associated with the eMBB service type, then the second uplink communications resources 518 are determined to have a higher priority than the first uplink communications resources 512.

In some embodiments, each codebook is associated with a codebook index value which implicitly indicates a priority associated with the codebook. For example, a codebook having a first index value may have a higher priority than a codebook having a second index value higher than the first index value.

In some embodiments, an indication of an allocation for uplink communications resources for transmitting acknowledgement information comprises an indication of a priority level associated with those communications resources. For example, in the example of FIG. 5, the first downlink control information 508 and second downlink control information 514 may comprise, respectively, an indication of a priority associated with the first uplink communications resources 512 and the second uplink communications resources 518.

In some embodiments, the downlink control information may comprise an explicit indication of the priority level associated with the corresponding uplink communications resources. In some embodiments, the communications device 104 determines the priority level of the uplink communications resources based on one or more other parameters indicated by the downlink control information.

For example, in some embodiments, the DCI may comprise an indication of a method of indicating a start time of the uplink communications resources. According to a first method, the start time may be constrained to be aligned with a start of a time unit, such as one of the timeslots 506a, 506b, 506c. This may be referred to as a PDSCH mapping type A. According to a second method, the start time is not constrained to be aligned with a start of a time unit. This may be referred to as a PDSCH mapping type B. Communications resources allocated by a DCI in which the start time is indicated by the first method may be associated with a lower priority than communications resources allocated by a DCI in which the start time is indicated by the second method. Accordingly, where the second method is used for allocating resources for the transmission of ACK information for lower latency data (such as URLLC data), those resources may be given higher priority than resources allocated by means of the first method, which may be used for higher bandwidth data having less stringent latency requirements (such as eMBB data).

A delay between the DCI and the start time of the uplink communications resources may be indicated with a particular granularity. This delay may be referred to as a PDSCH-PUCCH delay. In some embodiments, the communications device 104 may determine the priority of the uplink communications resources based on this granularity. For example, where the delay is expressed in units of sub-slots, the communications resources may have a higher priority than those where the delay is expressed in units of slots, a subslot being a time unit of finer granularity than a slot.

Thus, the communications device 104 may in some embodiments determine the priority of the uplink communications resources based on a granularity of a time unit used for the indication of the start time of the uplink communications resources.

In some embodiments, the DCI may be formatted according to one of a plurality of predetermined formats. Each format may be associated with a particular priority level. Accordingly, the communications device 104 may determine the DCI format used for a DCI, and based on the DCI format, determine the priority associated with the uplink communications resources allocated by the DCI.

In some embodiments, the downlink control information may be encoded using one of a plurality of temporary identifiers associated with the communications device 104. In particular, in some embodiments, cyclic redundancy check (CRC) bits associated with the DCI may be combined with a temporary identifier, by means of a logical bit-wise XOR operation. Each of the plurality of temporary identifiers associated with the communications device 104 may be associated with a priority level. Accordingly, the communications device 104 may determine which of the plurality of temporary identifiers associated with the communications device 104 was used to encode the DCI, and hence determine the corresponding priority of the uplink communications resources allocated by the DCI.

In some embodiments, the priority associated with the uplink communications resources indicated in a DCI is determined based on the downlink communications resources allocated by the DCI. For example, in some embodiments, the later the end of the downlink communications resources is, the higher the priority of the corresponding uplink communications resources. Referring to the example of FIG. 5, the first downlink communications resources 510 finish within the first timeslot 506a, and the second downlink communications resources 516 finish within the third timeslot 506c. Accordingly, the communications device 104 determines that the second uplink communications resources 518, being allocated by the same (second) DCI as the second downlink communications resources 516, has higher priority than the first uplink communications resources 512.

In some embodiments, each instance of downlink communications resources, such as the first downlink communications resources 510 and the second downlink communications resources 516 are used for the transmission of a single MAC TB.

In some embodiments, each instance of downlink communications resources, such as the first downlink communications resources 510 and the second downlink communications resources 516 are used for the transmission of one or more MAC TBs, and an acknowledgement status is determined for each MAC TB independently. Accordingly, in forming ACK information, more than one bit may be required to indicate the acknowledgement status of data received during a single instance of downlink communications resources.

In some embodiments, a MAC TB is sub-divided into a plurality of portions and an acknowledgement status is determined and maintained in respect of each portion independently. Accordingly, more than one bit within ACK information may be required to indicate the acknowledgement status of the constituent portions of a MAC TB. Each portion may be referred to as a code block group (CBG).

It will be appreciated that the use of CBGs may improve the efficiency of use of the wireless access interface, because only those CBGs which are determined to have been received in error need to be retransmitted, and not an entire MAC TB. However, this requires a corresponding increase in the quantity of ACK information being transmitted.

In some embodiments of the present technique, where CBGs are used, then in step S720, bundling is carried out in respect of groups of CBGs within a MAC TB. For example, if each MAC TB is divided into four CBGs, then the number of bits of ACK information can be reduced by half by bundling pairs of CBGs together. Alternatively (and having the same effect), the number of CBGs within a MAC TB, for the purpose of generating the ACK information may be reduced by half, for example from four to two CBGs per MAC TB.

In some embodiments, as described above, some ACK information is delayed. That is, ACK information that would have been transmitted within a particular timeslot is transmitted during a subsequent timeslot as a result of a conflict between two or more uplink communications resource allocations.

In some embodiments, a HARQ process may be synchronous; that is, acknowledgement information comprising an indication of the acknowledgement status of a data block may be expected to be transmitted within a certain time after the transmission of the data block.

In embodiments where the transmission of an indication of an acknowledgement status is delayed beyond this time limit, or does not occur at all, there may be consequential implications for the operation of the corresponding HARQ process. In particular, in accordance with conventional techniques, it may not be possible to transmit further data associated with the same HARQ process, even though all previous data associated with the HARQ process has been successfully received. This may lead to a reduction in the overall data throughput that is possible.

For convenience, a HARQ cycle is defined herein to refer to a time period starting with a timeslot in which data associated with a HARQ process is transmitted, and ending at the last timeslot prior to the earliest next timeslot in which data associated with the same HARQ process can be transmitted, taking into account acknowledgement information transmitted by the receiver of the data in respect of the earlier data transmission.

Figure 8:
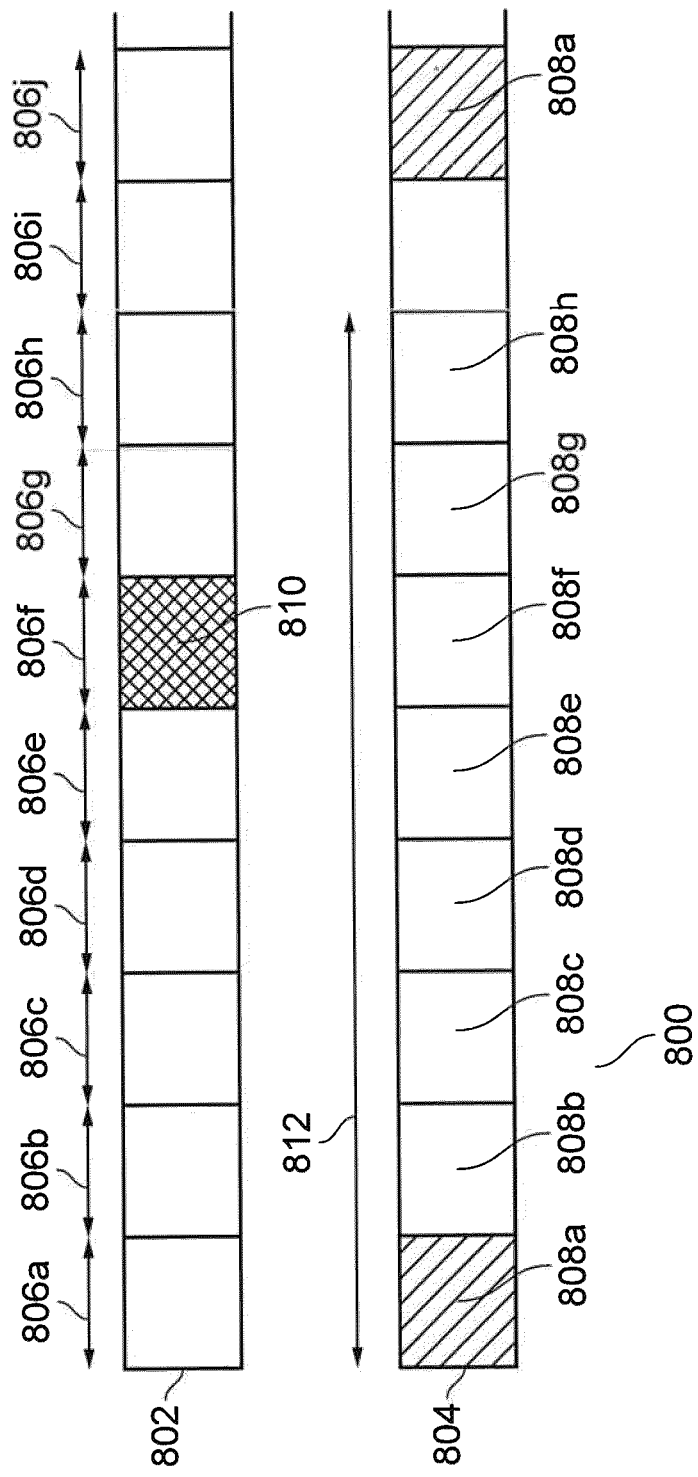
FIG. 8 shows a timeline of transmissions in accordance with a conventional synchronous hybrid automatic repeat request (HARQ) scheme in which a transmission of acknowledgement information is delayed.

An example of this problem is illustrated in FIG. 8.

FIG. 8 shows an uplink portion 802 and a downlink portion 804 of a wireless access interface 800. Communications resources of the wireless access interface 800 are divided into time slots 806a-j. Data 808a-h transmitted using the downlink communications resources in each time slot is associated with one of eight concurrently operating HARQ processes. For example, first data 808a transmitted during the first timeslot 806a is associated with a first HARQ process.

In the example of FIG. 8, each HARQ process requires that the acknowledgement status of data be transmitted within four timeslots after the most recent transmission of that data. Thus, acknowledgement information indicating the acknowledgement status of the first data 808a received during the first timeslot 806a is expected to be transmitted during the fifth timeslot 806e.

Double-headed arrow 812 indicates the extent of a HARQ cycle for the HARQ process associated with the first data 808a, which in the example of FIG. 8 has a duration of 8 timeslots. The HARQ cycle comprises a first timeslot during which the first data 808a is transmitted, four further timeslots permitted for the processing of the first data 808a by the communications device 104 and for forming the corresponding ACK information, one timeslot for the transmission of the ACK information and three further timeslots permitted for the processing of the acknowledgement information by the infrastructure equipment 101 and for selecting the next data (or a retransmission) to transmit during the first timeslot of the next HARQ cycle.

It will be appreciated that HARQ cycles of different durations are possible and the present disclosure is not limited to the specific example of HARQ cycles having a duration of 8 timeslots.

In the example of FIG. 8, as a result of a delay to the transmission of this acknowledgement information until the sixth timeslot 806f, the infrastructure equipment 101 is unable to determine whether the first data 808a has been received correctly by the communications device 104 in time to schedule a retransmission of the data in the eighth timeslot 806i.

In the example of FIG. 8, this has the effect that no data is transmitted to the communications device 104 during the eighth timeslot 806i, and a retransmission of the first data 808a occurs during the ninth timeslot 806j, in response to receiving acknowledgement information 810 indicating that the communications device 104 had not successfully received the first data 808a. The inventors of the present disclosure have appreciated that any delay in transmitting acknowledgement information where HARQ is used may have a detrimental effect on the throughput of data to the communications device 104. Such a delay may arise, for example, as a result of the use of the process illustrated in FIG. 6 and FIG. 7, where step S630 as described above, is carried out.

In some embodiments of the present technique, in response to determining that such a delay has occurred, then the infrastructure equipment 101 transmits a retransmission of the data, where the transmission of the acknowledgement status for that data has been delayed.

In some embodiments of the present technique, in response to determining that such a delay has occurred, then the infrastructure equipment 101 transmits an initial transmission of new data, where the transmission of the acknowledgement status for that data has been delayed. An example of this is shown in FIG. 9.

Figure 9:
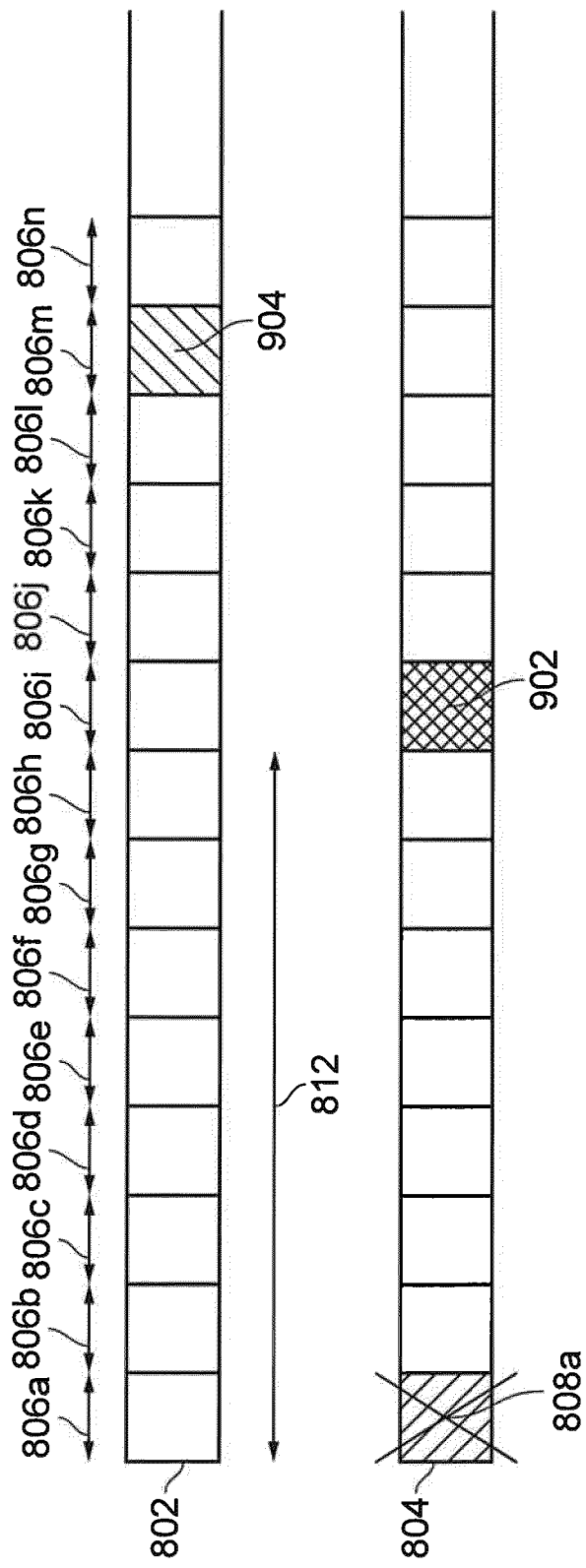
FIG. 9 shows transmissions and retransmission of data in accordance with some embodiments of the present technique.

FIG. 9 shows transmissions and retransmission of data in accordance with some embodiments of the present technique.

FIG. 9 shows first to fourteenth timeslots 806a-n of the wireless access interface 800 described above.

According to some embodiments of the present technique, where HARQ is used, if it is not possible to transmit some acknowledgement information within the time constraints associated with the HARQ requirements, then that acknowledgement information is not transmitted within the same HARQ cycle.

In response to determining that the acknowledgement information has not been transmitted, the infrastructure equipment 101 schedules, during the first timeslot of the subsequent HARQ cycle, new data 902 (i.e. data which has not previously been transmitted to the communications device 104).

The subsequent behaviour of the communications device 104 depends on whether the first data 808a has been correctly received.

If, as shown by the 'X' superimposed on the first data 808a in FIG. 9, the first data 808a has not been successfully received, then the communications device 104 may discard the new data 902 without attempting to decode it. During the thirteenth timeslot 806m, the communications device 104 transmits acknowledgement information 904 indicating a negative acknowledgement in respect of the first data 808a.

In response to receiving the negative acknowledgement, the infrastructure equipment 101 may subsequently retransmit the first data 808a (not shown in FIG. 9).

If the first data 808a was successfully received in the first timeslot 808a, then the communications device 104 attempts to decode the received new data 902.

In the thirteenth timeslot 806m, the communications device 104 transmits 'bundled' acknowledgement information in which the acknowledgement status for both the first data 808a and the new data 902 are represented by a single bit. If (in addition to the first data 808a) the communications device 104 received the new data 902 correctly, then the bundled acknowledgement information indicates a positive acknowledgement in respect of both. Accordingly, the infrastructure equipment 101 may determine that the communications device 104 has received both the first data 808a and the new data 902 correctly, and during the next HARQ cycle may transmit further new data that has not been previously transmitted to the communications device.

If the communications device 104 did not receive the new data 902 correctly, then the bundled acknowledgement information indicates a negative acknowledgement. The infrastructure equipment 101 may not be able to distinguish between this scenario and the scenario shown in FIG. 9, and may thus subsequently retransmit the first data 808a.

In some embodiments, such as where step S630 is carried out within the same HARQ cycle as the received first data 808a, the communications device 104 may transmit acknowledgement information comprising an indication of the acknowledgement status of the first data 808a, although it is transmitted too late for the infrastructure equipment 101 to be able to take it into account in selecting data for transmitting using the same HARQ process during the next HARQ cycle.

The infrastructure equipment 101 may nevertheless proceed as shown in FIG. 9 by transmitting new data using the HARQ process during the next HARQ cycle.

In some embodiments, the communications device 104 may then transmit second acknowledgement information indicating the acknowledgement status of the new data 902 during the next HARQ cycle, without bundling this with the status of the first data 808a.

Based on the delayed acknowledgement information transmitted by the communications device 104 during the first HARQ cycle, and the second acknowledgement information transmitted by the communications device 104 during the next HARQ cycle, the infrastructure equipment 101 may determine the next data (new data or retransmission of previously transmitted data) to subsequently send using the same HARQ process.

For example, the infrastructure equipment may proceed as follows:

If the delayed acknowledgement indicates NACK for first data 808a, the infrastructure equipment 101 may then retransmit the first data 808a using a soft-combination scheme. The new data 902 is not stored in a HARQ buffer of the communications device 104 and the next retransmission of the new data 902 infrastructure equipment 101 may not be in accordance with a soft-combination scheme.

If the delayed acknowledgement indicates ACK for first data 808a, then:
  if the second acknowledgement information transmitted by the communications device 104 during the next HARQ cycle indicates ACK (for the new data 902), then the infrastructure equipment 101 schedules further new data (i.e. not a retransmission of previously-transmitted data) for transmission during the subsequent HARQ cycle; and
  if the second acknowledgement information transmitted by the communications device 104 during the next HARQ cycle indicates NACK (for the new data 902), then the infrastructure equipment 101 retransmits the new data 902 during the subsequent HARQ cycle.

Above has been described behaviour of a communications device in accordance with embodiments of the present technique.

It will be appreciated that corresponding behaviour by the infrastructure equipment 101 also falls within the scope of the present disclosure.

Figure 10:
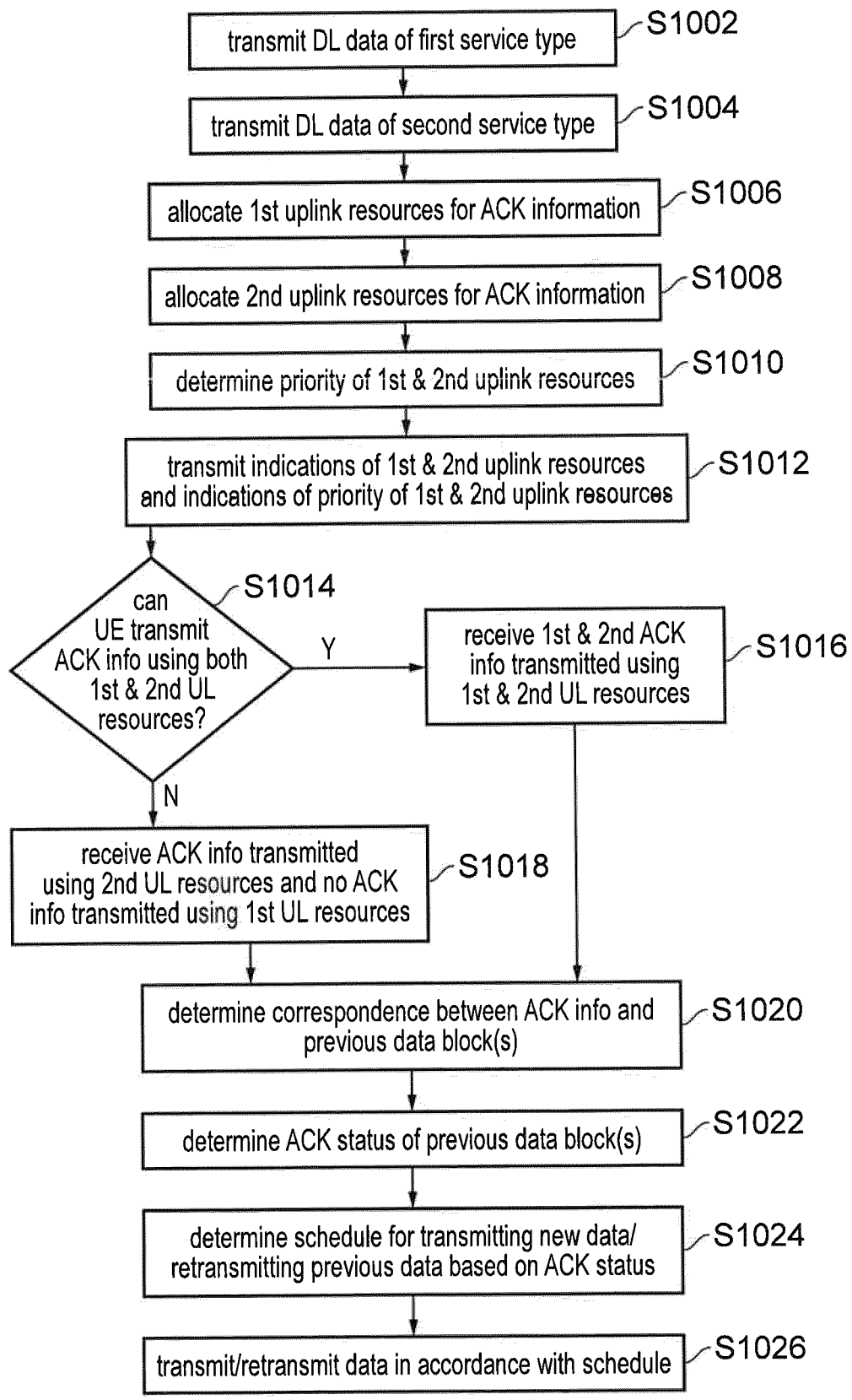
FIG. 10 illustrates a process according to embodiments of the present technique for transmitting data and receiving acknowledgement information by an infrastructure equipment.

FIG. 10 illustrates a process according to embodiments of the present technique for transmitting data and receiving acknowledgement information by an infrastructure equipment.

The process of FIG. 10 starts at step S1002 in which the infrastructure equipment 101 transmits downlink data associated with the first service type, such as the eMBB service, to the communications device 104.

At step S1004, the infrastructure equipment 101 transmits downlink data associated with the second service type, such as the URLLC service to the communications device 104.

At step S1006, the infrastructure equipment 101 allocates the first uplink communications resources for the transmission of acknowledgement information related to data blocks of the first service type by the communications device 104, and at step S1008, the infrastructure equipment 101 allocates the second uplink communications resources for the transmission of acknowledgement information related to data blocks of the second service type by the communications device 104.

At step S1010, the infrastructure equipment 101 determines a priority for the first uplink communications resources and the second uplink communications resources. These priorities correspond to the priorities determined by the communications device, for example at step S626 of the process illustrated in FIG. 6 and described above, and determines which of the first and second uplink communications resources will be used for the transmission of acknowledgement information, in the event that the communications device 104 is unable to transmit acknowledgement information using both the first and second uplink communications resources.

At step S1012, the infrastructure equipment 101 transmits indications of first and second uplink communications resources together with indications of their respective priorities. In some embodiments, the priority indications may be transmitted separately, for example as part of earlier RRC signalling for configuring the communications device 104. In some embodiments, the priority indications may be implicit (e.g. based on the data service type for which the acknowledgement information is expected).

The indications of priorities may be in accordance with one or more of the techniques described above for determining the respective priorities by the communications device 104.

At step S1014, the infrastructure equipment determines whether the communications device 104 is able to transmit acknowledgement information using both the first uplink communications resources allocated for the transmission of acknowledgement information relating to data of the first service type and the second uplink communications resources, allocated for the transmission of acknowledgement information relating to data of the second service type. This step may broadly correspond to the determination performed by the communications device 104 at step S610 in the process illustrated in FIG. 6.

If, at step S1014, it is determined that the communications device 104 can transmit using both the first and second uplink communications resources ("Y"), then control passes to step S1016. The infrastructure equipment 101 receives acknowledgement information related to previous data of the first service type transmitted using the first uplink communications resources, and acknowledgement information related to previous data of the second service type transmitted using the second uplink communications resources.

Control then passes to step S1020.

If, at step S1014, it is determined that the communications device 104 cannot transmit using both the first and second uplink communications resources ("N"), then control passes to step S1018. The infrastructure equipment 101 receives acknowledgement information related to previous data of the second service type transmitted using the second uplink communications resources. In some embodiments, the acknowledgement information transmitted using the second uplink communications resources additionally comprises acknowledgement information related to previous data of the first service type transmitted using the second uplink communications resources, as described above in respect of the processes illustrated in FIG. 6 and FIG. 7.

In some embodiments, the infrastructure equipment receives no acknowledgement information transmitted by the communications device using the second uplink communications resources.

Subsequently in step S1020, the infrastructure equipment 101 determines a correspondence between the acknowledgement information received and previously transmitted data blocks. If step S1020 is preceded by step S1018, then in some embodiments, the infrastructure equipment 101 determines a process by which the communications device 104 has formed the acknowledgement information. For example, the infrastructure equipment 101 may determine the correspondence based on determining that the communications device 104 has implemented steps S702-S708, and (following the dashed line 750b) steps S714-S718 of the process of FIG. 7 and described above.

According to embodiments of the present technique, the infrastructure equipment 101 may carry out one or more of the steps shown in FIG. 6 or FIG. 7 to determine a mapping between the acknowledgement information received and previously transmitted data blocks.

If step S1020 is preceded by step S1016, then the determination of the correspondence may be in accordance with conventional techniques.

Control then passes to step S1022, in which the infrastructure equipment 101 determines the acknowledgement status (i.e. whether a data block has, or has not been correctly received) at the communications device 104 for the previously transmitted downlink data.

Based on the determined acknowledgement status, then at step S1024, the infrastructure equipment 101 determines a schedule for future transmissions to the communications device 104. These future transmissions may comprise initial transmissions of data that has not been previously been transmitted and/or retransmissions of data that has been previously transmitted.

For example, if a determined acknowledgement status for a data block is negative, meaning that the communications device 104 has not successfully received that data block, the infrastructure equipment 101 may schedule a retransmission of that data block.

In step S1026, the infrastructure equipment 101 performs subsequent transmissions and/or retransmissions in accordance with the schedule determined at step S1024.

It will be appreciated that in some embodiments, one or more of the steps of the processes illustrated in FIG. 6, FIG. 7 and FIG. 10 may be adapted, omitted or performed in a different order from that shown.

It will be appreciated that preferably the steps taken by the infrastructure equipment 101 are in correspondence with those taken by the communications device 104 in order for the behaviour of each to be deterministic in a given scenario.

Thus there has been described a method of receiving data by a communications device in a wireless communications network, the method comprising receiving one or more first downlink data blocks and one or more second downlink data blocks, for each of the one or more first downlink data blocks and one or more second downlink data blocks determining an acknowledgement status, the acknowledgement status indicating whether the downlink data block was correctly received or not received correctly (ACK/NACK), receiving an indication of first uplink communications resources allocated for transmitting first acknowledgement information including the acknowledgement status for the one or more first downlink data blocks, determining that the first uplink communications resources are allocated for the transmission of acknowledgement information generated in accordance with a first codebook, the first codebook for generating acknowledgement information associated with the one or more first downlink data blocks, receiving an indication of second uplink communications resources allocated for transmitting second acknowledgement information including the acknowledgement status for the one or more second downlink data blocks, determining that the second uplink communications resources are allocated for the transmission of acknowledgement information generated in accordance with a second codebook, the second codebook for generating acknowledgement information associated with the one or more second data blocks, determining that the communications device is not capable of transmitting acknowledgement information using the first uplink communications resources and acknowledgement information using the second uplink communications resources, determining that a priority for transmitting acknowledgement information using the second communications resources is higher than a priority for transmitting acknowledgement information using the first communications resources, and in response to determining that the priority for transmitting acknowledgement information using the second communications resources is higher than the priority for transmitting acknowledgement information using the first communications resources, transmitting acknowledgement information using the second uplink communications resources, the transmitted acknowledgement information comprising an acknowledgement status indication representing the acknowledgement status of the one or more second downlink data blocks, and not transmitting acknowledgement information using the first communications resources.

There has further been described a method of receiving data by a communications device in a wireless communications network, the method comprising receiving a first downlink data block transmitted using communications resources associated with a first process of a repeat request protocol, receiving a second downlink data block transmitted using communications resources associated with a second process of a repeat request protocol, for each of the first downlink data block and the second downlink data block determining an acknowledgement status, the acknowledgement status indicating whether the downlink data block was correctly received or not received correctly (ACK/NACK), determining first uplink communications resources allocated in accordance with the first process of a repeat request protocol for transmitting first acknowledgement information including the acknowledgement status for the first downlink data block, determining that the first uplink communications resources are allocated for the transmission of acknowledgement information generated in accordance with a first codebook, the first codebook for generating acknowledgement information associated with the first downlink data block, determining second uplink communications resources allocated in accordance with the second process of a repeat request protocol for transmitting second acknowledgement information including the acknowledgement status for the second downlink data block, determining that the second uplink communications resources are allocated for the transmission of acknowledgement information generated in accordance with a second codebook, the second codebook for generating acknowledgement information associated with the second data block, determining that the communications device is not capable of transmitting acknowledgement information using the first uplink communications resources and acknowledgement information using the second uplink communications resources, determining that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, refraining from transmitting acknowledgement information using the first uplink communications resources, and receiving an initial transmission of a third downlink data block, the third downlink data block transmitted using next downlink communications resources associated with the first process of the repeat request protocol.

Corresponding methods for transmitting data by an infrastructure equipment have also been disclosed.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of receiving data by a communications device in a wireless communications network, the method comprising receiving one or more first downlink data blocks and one or more second downlink data blocks, for each of the one or more first downlink data blocks and one or more second downlink data blocks determining an acknowledgement status, the acknowledgement status indicating whether the downlink data block was correctly received or not received correctly (ACK/NACK), receiving an indication of first uplink communications resources allocated for transmitting first acknowledgement information including the acknowledgement status for the one or more first downlink data blocks, determining that the first uplink communications resources are allocated for the transmission of acknowledgement information generated in accordance with a first codebook, the first codebook for generating acknowledgement information associated with the one or more first downlink data blocks, receiving an indication of second uplink communications resources allocated for transmitting second acknowledgement information including the acknowledgement status for the one or more second downlink data blocks, determining that the second uplink communications resources are allocated for the transmission of acknowledgement information generated in accordance with a second codebook, the second codebook for generating acknowledgement information associated with the one or more second data blocks, determining that the communications device is not capable of transmitting acknowledgement information using the first uplink communications resources and acknowledgement information using the second uplink communications resources, determining that a priority for transmitting acknowledgement information using the second communications resources is higher than a priority for transmitting acknowledgement information using the first communications resources, and in response to determining that the priority for transmitting acknowledgement information using the second communications resources is higher than the priority for transmitting acknowledgement information using the first communications resources, transmitting acknowledgement information using the second uplink communications resources, the transmitted acknowledgement information comprising an acknowledgement status indication representing the acknowledgement status of the one or more second downlink data blocks, and not transmitting acknowledgement information using the first communications resources.

Paragraph 2. A method according to paragraph 1, the method comprising in response to determining that the priority for transmitting acknowledgement information using the second communications resources is higher than the priority for transmitting acknowledgement information using the first communications resources, selecting a first number of the one or more first downlink data blocks, wherein the transmitted acknowledgement information comprises a second number of acknowledgement status indications based on an acknowledgement status associated with each of the selected first number of first downlink data blocks.

Paragraph 3. A method according to paragraph 2, wherein determining the first number comprises determining a number of the first data blocks whose acknowledgement status would have been indicated by means of acknowledgement information transmitted using the first uplink communications resources in the absence of the allocation of the second uplink communications resources.

Paragraph 4. A method according to paragraph 2 or paragraph 3, wherein determining the second number comprises determining a number of acknowledgement status indications that would have been included in acknowledgement information transmitted using the first communications resources in the absence of the allocation of the second uplink communications resources.

Paragraph 5. A method according to any of paragraphs 2 to 4, the method comprising determining a number of acknowledgement status indications that can be included in acknowledgement information transmitted using the second uplink communications resources, and determining one or more of the first number and the second number based on the number of acknowledgement status indications that can be included in the acknowledgement information transmitted using the second uplink communications resources.

Paragraph 6. A method according to any of paragraphs 2 to 5, wherein the second number is one and wherein the acknowledgement status indication based on the acknowledgement status associated with each of the selected first number of first downlink data blocks comprises an indication of whether all of the selected first downlink data blocks have been correctly received.

Paragraph 7. A method according to any of paragraphs 2 to 5 wherein the first number is equal to the second number, and the transmitted acknowledgement information comprises an acknowledgement status indication for each of the selected first downlink data blocks.

Paragraph 8. A method according to paragraph 1, wherein the transmitted acknowledgement information does not include any acknowledgement status indication based on an acknowledgement status associated with a first downlink data block.

Paragraph 9. A method according to any of paragraphs 1 to 8, wherein determining that the priority for transmitting acknowledgement information using the second communications resources is higher than the priority for transmitting acknowledgement information using the first communications resources comprises determining that the second codebook has a higher priority than the first codebook.

Paragraph 10. A method according to paragraph 9, wherein determining that the second codebook has a higher priority than the first codebook comprises determining a first priority associated with the first codebook, and determining a second priority associated with the second codebook.

Paragraph 11. A method according to paragraph 9 or paragraph 10, wherein a codebook index of the second codebook is lower than a codebook index of the first codebook.

Paragraph 12. A method according to any of paragraphs 1 to 11, the method comprising receiving first downlink control information for scheduling one of the first downlink data blocks, and receiving second downlink control information for scheduling one of the second downlink data blocks.

Paragraph 13. A method according to paragraph 12, wherein the first downlink control information comprises an indication of the first codebook, and the second downlink control information comprises an indication of the second codebook.

Paragraph 14. A method according to paragraph 12 or paragraph 13, wherein the first downlink control information comprises the indication of the first uplink communications resources, the first uplink communications resources being associated with a first priority, the second downlink control information comprises the indication of the second uplink communications resources, the second uplink communications resources being associated with a second priority, and determining that the priority for transmitting acknowledgement information using the second communications resources is higher than the priority for transmitting acknowledgement information using the first communications resources comprises determining that the second priority associated with the second uplink communications resources is higher than the first priority associated with the first uplink communications resources.

Paragraph 15. A method according to any of paragraphs 12 to 14, wherein the first downlink control information comprises an indication of a start time of the first uplink communications resources, the second downlink control information comprises an indication of a start time of the second uplink communications resources, and determining that the second priority associated with the second uplink communications resources is higher than the first priority associated with the first uplink communications resources comprises determining that a second time unit for the indication of the second uplink communications resources is smaller than a first time unit for the indication of the first uplink communications resources.

Paragraph 16. A method according to any of paragraphs 12 to 15, wherein the first downlink control information comprises an indication of a first mapping type for one of the first downlink data blocks, the second downlink control information comprises an indication of a second mapping type for one of the second downlink data blocks, and determining that the priority for transmitting acknowledgement information using the second communications resources is higher than the priority for transmitting acknowledgement information using the first communications resources comprises determining that the second mapping type is associated with a priority higher than a priority associated with the first mapping type.

Paragraph 17. A method according to any of paragraphs 12 to 16, wherein the first downlink control information comprises error checking bits scrambled by a first of a plurality of temporary identifiers associated with the communications device, the second downlink control information comprises error checking bits scrambled by a second of the plurality of temporary identifiers associated with the communications device, and determining that the priority for transmitting acknowledgement information using the second communications resources is higher than the priority for transmitting acknowledgement information using the first communications resources comprises determining that the second temporary identifier is associated with a priority higher than a priority associated with the first temporary identifier.

Paragraph 18. A method according to any of paragraphs 12 to 17, wherein the first downlink control information is formatted in accordance with a first of a plurality of predetermined downlink control information formats, the second downlink control information is formatted in accordance with a second of the plurality of predetermined downlink control information formats, and determining that the priority for transmitting acknowledgement information using the second communications resources is higher than the priority for transmitting acknowledgement information using the first communications resources comprises determining that the second predetermined downlink control information format is associated with a priority higher than a priority associated with the first downlink control information format.

Paragraph 19. A method according to any of paragraphs 1 to 18, wherein the first downlink data block is associated with a first data type, the second downlink data block is associated with a second data type, and determining that the priority for transmitting acknowledgement information using the second communications resources is higher than the priority for transmitting acknowledgement information using the first communications resources comprises determining that the second data type is associated with a priority higher than a priority associated with the first data type.

Paragraph 20. A method according to paragraph 19, wherein the first data type is associated with first quality of service requirements and the second data type is associated with first quality of service requirements.

Paragraph 21. A method according to any of paragraphs 1 to 20, wherein determining that the communications device is not capable of transmitting acknowledgement information using both the first uplink communications resources and the second uplink communications resources comprises determining that the first uplink communications resources and the second uplink communications resources overlap in time.

Paragraph 22. A method of transmitting data by an infrastructure equipment to a communications device in a wireless communications network, the method comprising transmitting one or more first downlink data blocks and one or more second downlink data blocks, transmitting an indication of first uplink communications resources allocated for transmitting by the communications device first acknowledgement information including the acknowledgement status for the one or more first downlink data blocks, determining that the first uplink communications resources are allocated for the transmission of acknowledgement information generated in accordance with a first codebook, the first codebook for generating acknowledgement information associated with the one or more first downlink data blocks, transmitting an indication of second uplink communications resources allocated for transmitting by the communications device second acknowledgement information including the acknowledgement status for the one or more second downlink data blocks, determining that the second uplink communications resources are allocated for the transmission of acknowledgement information generated in accordance with a second codebook, the second codebook for generating acknowledgement information associated with the second data blocks, receiving acknowledgement information transmitted using the second uplink communications resources, determining that the communications device is not capable of transmitting acknowledgement information using the first uplink communications resources and acknowledgement information using the second uplink communications resources, determining that a priority for transmitting by the communications device acknowledgement information using the second communications resources is higher than a priority for transmitting the communications device acknowledgement information using the first communications resources, and in response to determining that the priority for transmitting by the communications device acknowledgement information using the second communications resources is higher than the priority for transmitting the communications device acknowledgement information using the first communications resources determining that the received acknowledgement information comprises one or more acknowledgement status indications representing an acknowledgement status for the one or more second downlink data blocks, and based on the received acknowledgement information, for each of the one or more second downlink data blocks, determining an acknowledgement status indicating whether the downlink data block was correctly received by the communications device.

Paragraph 23. A method according to paragraph 22, the method comprising: in response to determining that the priority for transmitting by the communications device acknowledgement information using the second communications resources is higher than the priority for transmitting the communications device acknowledgement information using the first communications resources, determining that the received acknowledgement information comprises one or more acknowledgement status indications representing an acknowledgement status for one or more of the first downlink data blocks, and based on the received acknowledgement information, determining for each of the one or more of the first downlink data blocks an acknowledgement status.

Paragraph 24. A method according to paragraph 22 or paragraph 23, the method comprising based on the determined acknowledgement status of one of the second downlink data blocks, determining to retransmit the one of the second downlink data blocks.

Paragraph 25. A method of receiving data by a communications device in a wireless communications network, the method comprising receiving a first downlink data block transmitted using communications resources associated with a first process of a repeat request protocol, receiving a second downlink data block transmitted using communications resources associated with a second process of a repeat request protocol, for each of the first downlink data block and the second downlink data block determining an acknowledgement status, the acknowledgement status indicating whether the downlink data block was correctly received or not received correctly (ACK/NACK), determining first uplink communications resources allocated in accordance with the first process of a repeat request protocol for transmitting first acknowledgement information including the acknowledgement status for the first downlink data block, determining that the first uplink communications resources are allocated for the transmission of acknowledgement information generated in accordance with a first codebook, the first codebook for generating acknowledgement information associated with the first downlink data block, determining second uplink communications resources allocated in accordance with the second process of a repeat request protocol for transmitting second acknowledgement information including the acknowledgement status for the second downlink data block, determining that the second uplink communications resources are allocated for the transmission of acknowledgement information generated in accordance with a second codebook, the second codebook for generating acknowledgement information associated with the second data block, determining that the communications device is not capable of transmitting acknowledgement information using the first uplink communications resources and acknowledgement information using the second uplink communications resources, determining that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, refraining from transmitting acknowledgement information using the first uplink communications resources, and receiving an initial transmission of a third downlink data block, the third downlink data block transmitted using next downlink communications resources associated with the first process of the repeat request protocol.

Paragraph 26. A method according to paragraph 25, the method comprising: transmitting acknowledgement information comprising an indication of an acknowledgement status for the first downlink data block using uplink communications resources occurring after the first uplink communications resources.

Paragraph 27. A method according to paragraph 25 or paragraph 26, the method comprising determining that the first downlink data block was not correctly received, and in response to determining that the first downlink data block was not correctly received, discarding the third downlink data block.

Paragraph 28. A method according to any of paragraphs 25 to 27, the method comprising determining third uplink communications resources allocated for transmitting acknowledgement information in respect of the first data block, a delay between the receiving the first downlink data block and the third uplink communications resources being in accordance with the first repeat request protocol, and transmitting acknowledgement information using the third uplink communications resources indicating that one or both of the first downlink data block and the third downlink data block have not been received correctly.

Paragraph 29. A method according to paragraph 25 or paragraph 26, the method comprising: determining that the first downlink data block was correctly received, determining that the third downlink data block was correctly received, determining third uplink communications resources allocated for transmitting acknowledgement information in respect of the first data block, a delay between the receiving the first downlink data block and the third uplink communications resources being in accordance with the first repeat request protocol, and transmitting acknowledgement information using the third uplink communications resources indicating that both of the first downlink data block and the third downlink data block have been received correctly.

Paragraph 30. A method of transmitting data to a communications device in a wireless communications network, the method comprising transmitting a first downlink data block using communications resources associated with a first process of a repeat request protocol, transmitting a second downlink data block using communications resources associated with a second process of a repeat request protocol, determining first uplink communications resources allocated in accordance with the first process of a repeat request protocol for transmitting by the communications device first acknowledgement information including the acknowledgement status for the first downlink data block, determining that the first uplink communications resources are allocated for the transmission of acknowledgement information generated in accordance with a first codebook, the first codebook for generating acknowledgement information associated with the first downlink data block, determining second uplink communications resources allocated in accordance with the second process of a repeat request protocol for transmitting by the communications device second acknowledgement information including the acknowledgement status for the second downlink data block, determining that the second uplink communications resources are allocated for the transmission of acknowledgement information generated in accordance with a second codebook, the second codebook for generating acknowledgement information associated with the second data block, determining that the communications device is not capable of transmitting acknowledgement information using the first uplink communications resources and acknowledgement information using the second uplink communications resources, determining that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, transmitting an initial transmission of a third downlink data block, the third downlink data block transmitted using next communications resources associated with the first process of the repeat request protocol, wherein no acknowledgement information is received which is transmitted by the communications device using the first uplink communications resources.

Paragraph 31. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive one or more first downlink data blocks and one or more second downlink data blocks, for each of the one or more first downlink data blocks and one or more second downlink data blocks to determine an acknowledgement status, the acknowledgement status indicating whether the downlink data block was correctly received or not received correctly (ACK/NACK), to receive an indication of first uplink communications resources allocated for transmitting first acknowledgement information including the acknowledgement status for the one or more first downlink data blocks, to determine that the first uplink communications resources are allocated for the transmission of acknowledgement information generated in accordance with a first codebook, the first codebook for generating acknowledgement information associated with the one or more first downlink data blocks, to receive an indication of second uplink communications resources allocated for transmitting second acknowledgement information including the acknowledgement status for the one or more second downlink data blocks, to determine that the second uplink communications resources are allocated for the transmission of acknowledgement information generated in accordance with a second codebook, the second codebook for generating acknowledgement information associated with the one or more second data blocks, to determine that the communications device is not capable of transmitting acknowledgement information using the first uplink communications resources and acknowledgement information using the second uplink communications resources, to determine that a priority for transmitting acknowledgement information using the second communications resources is higher than a priority for transmitting acknowledgement information using the first communications resources, and in response to determining that the priority for transmitting acknowledgement information using the second communications resources is higher than the priority for transmitting acknowledgement information using the first communications resources, to transmit acknowledgement information using the second uplink communications resources, the transmitted acknowledgement information comprising an acknowledgement status indication representing the acknowledgement status of the one or more second downlink data blocks, and not to transmit acknowledgement information using the first communications resources.

Paragraph 32. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive one or more first downlink data blocks and one or more second downlink data blocks, for each of the one or more first downlink data blocks and one or more second downlink data blocks to determine an acknowledgement status, the acknowledgement status indicating whether the downlink data block was correctly received or not received correctly (ACK/NACK), to receive an indication of first uplink communications resources allocated for transmitting first acknowledgement information including the acknowledgement status for the one or more first downlink data blocks, to determine that the first uplink communications resources are allocated for the transmission of acknowledgement information generated in accordance with a first codebook, the first codebook for generating acknowledgement information associated with the one or more first downlink data blocks, to receive an indication of second uplink communications resources allocated for transmitting second acknowledgement information including the acknowledgement status for the one or more second downlink data blocks, to determine that the second uplink communications resources are allocated for the transmission of acknowledgement information generated in accordance with a second codebook, the second codebook for generating acknowledgement information associated with the one or more second data blocks, to determine that the communications device is not capable of transmitting acknowledgement information using the first uplink communications resources and acknowledgement information using the second uplink communications resources, to determine that a priority for transmitting acknowledgement information using the second communications resources is higher than a priority for transmitting acknowledgement information using the first communications resources, and in response to determining that the priority for transmitting acknowledgement information using the second communications resources is higher than the priority for transmitting acknowledgement information using the first communications resources, to transmit acknowledgement information using the second uplink communications resources, the transmitted acknowledgement information comprising an acknowledgement status indication representing the acknowledgement status of the one or more second downlink data blocks, and not to transmit acknowledgement information using the first communications resources.

Paragraph 33. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit one or more first downlink data blocks and one or more second downlink data blocks, to transmit an indication of first uplink communications resources allocated for transmitting by the communications device first acknowledgement information including the acknowledgement status for the one or more first downlink data blocks, to determine that the first uplink communications resources are allocated for the transmission of acknowledgement information generated in accordance with a first codebook, the first codebook for generating acknowledgement information associated with the one or more first downlink data blocks, to transmit an indication of second uplink communications resources allocated for transmitting by the communications device second acknowledgement information including the acknowledgement status for the one or more second downlink data blocks, to determine that the second uplink communications resources are allocated for the transmission of acknowledgement information generated in accordance with a second codebook, the second codebook for generating acknowledgement information associated with the second data blocks, to receive acknowledgement information transmitted using the second uplink communications resources, to determine that the communications device is not capable of transmitting acknowledgement information using the first uplink communications resources and acknowledgement information using the second uplink communications resources, to determine that a priority for transmitting by the communications device acknowledgement information using the second communications resources is higher than a priority for transmitting the communications device acknowledgement information using the first communications resources, and in response to determining that the priority for transmitting by the communications device acknowledgement information using the second communications resources is higher than the priority for transmitting the communications device acknowledgement information using the first communications resources to determine that the received acknowledgement information comprises one or more acknowledgement status indications representing an acknowledgement status for the one or more second downlink data blocks, and based on the received acknowledgement information, for each of the one or more second downlink data blocks, to determine an acknowledgement status indicating whether the downlink data block was correctly received by the communications device.

Paragraph 34. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit one or more first downlink data blocks and one or more second downlink data blocks, to transmit an indication of first uplink communications resources allocated for transmitting by the communications device first acknowledgement information including the acknowledgement status for the one or more first downlink data blocks, to determine that the first uplink communications resources are allocated for the transmission of acknowledgement information generated in accordance with a first codebook, the first codebook for generating acknowledgement information associated with the one or more first downlink data blocks, to transmit an indication of second uplink communications resources allocated for transmitting by the communications device second acknowledgement information including the acknowledgement status for the one or more second downlink data blocks, to determine that the second uplink communications resources are allocated for the transmission of acknowledgement information generated in accordance with a second codebook, the second codebook for generating acknowledgement information associated with the second data blocks, to receive acknowledgement information transmitted using the second uplink communications resources, to determine that the communications device is not capable of transmitting acknowledgement information using the first uplink communications resources and acknowledgement information using the second uplink communications resources, to determine that a priority for transmitting by the communications device acknowledgement information using the second communications resources is higher than a priority for transmitting the communications device acknowledgement information using the first communications resources, and in response to determining that the priority for transmitting by the communications device acknowledgement information using the second communications resources is higher than the priority for transmitting the communications device acknowledgement information using the first communications resources to determine that the received acknowledgement information comprises one or more acknowledgement status indications representing an acknowledgement status for the one or more second downlink data blocks, and based on the received acknowledgement information, for each of the one or more second downlink data blocks, to determine an acknowledgement status indicating whether the downlink data block was correctly received by the communications device.

Paragraph 35. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive a first downlink data block transmitted using communications resources associated with a first process of a repeat request protocol, to receive a second downlink data block transmitted using communications resources associated with a second process of a repeat request protocol, for each of the first downlink data block and the second downlink data block to determine an acknowledgement status, the acknowledgement status indicating whether the downlink data block was correctly received or not received correctly (ACK/NACK), to determine first uplink communications resources allocated in accordance with the first process of a repeat request protocol for transmitting first acknowledgement information including the acknowledgement status for the first downlink data block, to determine that the first uplink communications resources are allocated for the transmission of acknowledgement information generated in accordance with a first codebook, the first codebook for generating acknowledgement information associated with the first downlink data block, to determine second uplink communications resources allocated in accordance with the second process of a repeat request protocol for transmitting second acknowledgement information including the acknowledgement status for the second downlink data block, to determine that the second uplink communications resources are allocated for the transmission of acknowledgement information generated in accordance with a second codebook, the second codebook for generating acknowledgement information associated with the second data block, to determine that the communications device is not capable of transmitting acknowledgement information using the first uplink communications resources and acknowledgement information using the second uplink communications resources, to determine that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, to refrain from transmitting acknowledgement information using the first uplink communications resources, and to receive an initial transmission of a third downlink data block, the third downlink data block transmitted using next downlink communications resources associated with the first process of the repeat request protocol.

Paragraph 36. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a first downlink data block transmitted using communications resources associated with a first process of a repeat request protocol, to receive a second downlink data block transmitted using communications resources associated with a second process of a repeat request protocol, for each of the first downlink data block and the second downlink data block to determine an acknowledgement status, the acknowledgement status indicating whether the downlink data block was correctly received or not received correctly (ACK/NACK), to determine first uplink communications resources allocated in accordance with the first process of a repeat request protocol for transmitting first acknowledgement information including the acknowledgement status for the first downlink data block, to determine that the first uplink communications resources are allocated for the transmission of acknowledgement information generated in accordance with a first codebook, the first codebook for generating acknowledgement information associated with the first downlink data block, to determine second uplink communications resources allocated in accordance with the second process of a repeat request protocol for transmitting second acknowledgement information including the acknowledgement status for the second downlink data block, to determine that the second uplink communications resources are allocated for the transmission of acknowledgement information generated in accordance with a second codebook, the second codebook for generating acknowledgement information associated with the second data block, to determine that the communications device is not capable of transmitting acknowledgement information using the first uplink communications resources and acknowledgement information using the second uplink communications resources, to determine that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, to refrain from transmitting acknowledgement information using the first uplink communications resources, and to receive an initial transmission of a third downlink data block, the third downlink data block transmitted using next downlink communications resources associated with the first process of the repeat request protocol.

Paragraph 37. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a first downlink data block using communications resources associated with a first process of a repeat request protocol, to transmit a second downlink data block using communications resources associated with a second process of a repeat request protocol, to determine first uplink communications resources allocated in accordance with the first process of a repeat request protocol for transmitting by the communications device first acknowledgement information including the acknowledgement status for the first downlink data block, to determine that the first uplink communications resources are allocated for the transmission of acknowledgement information generated in accordance with a first codebook, the first codebook for generating acknowledgement information associated with the first downlink data block, to determine second uplink communications resources allocated in accordance with the second process of a repeat request protocol for transmitting by the communications device second acknowledgement information including the acknowledgement status for the second downlink data block, to determine that the second uplink communications resources are allocated for the transmission of acknowledgement information generated in accordance with a second codebook, the second codebook for generating acknowledgement information associated with the second data block, to determine that the communications device is not capable of transmitting acknowledgement information using the first uplink communications resources and acknowledgement information using the second uplink communications resources, to determine that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, to transmit an initial transmission of a third downlink data block, the third downlink data block transmitted using next communications resources associated with the first process of the repeat request protocol, wherein no acknowledgement information is received which is transmitted by the communications device using the first uplink communications resources.

Paragraph 38. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a first downlink data block using communications resources associated with a first process of a repeat request protocol, to transmit a second downlink data block using communications resources associated with a second process of a repeat request protocol, to determine first uplink communications resources allocated in accordance with the first process of a repeat request protocol for transmitting by the communications device first acknowledgement information including the acknowledgement status for the first downlink data block, to determine that the first uplink communications resources are allocated for the transmission of acknowledgement information generated in accordance with a first codebook, the first codebook for generating acknowledgement information associated with the first downlink data block, to determine second uplink communications resources allocated in accordance with the second process of a repeat request protocol for transmitting by the communications device second acknowledgement information including the acknowledgement status for the second downlink data block, to determine that the second uplink communications resources are allocated for the transmission of acknowledgement information generated in accordance with a second codebook, the second codebook for generating acknowledgement information associated with the second data block, to determine that the communications device is not capable of transmitting acknowledgement information using the first uplink communications resources and acknowledgement information using the second uplink communications resources, to determine that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, to transmit an initial transmission of a third downlink data block, the third downlink data block transmitted using next communications resources associated with the first process of the repeat request protocol, wherein no acknowledgement information is received which is transmitted by the communications device using the first uplink communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.

[2] Holma H. and Toskala A, "LTE for UMTS OFDMA and SC-FDMA based radio access", John Wiley and Sons, 2009

[3] 3GPP TS 38.321, "Medium Access Control (MAC) protocol specification (Rel-15)", v15.3.0

[4] 3GPP TS 38.214 "NR; Physical layer procedures for data (Release 15)", version 15.2.0

[5] R2-1818795, "LS on Intra-UE Prioritization/Multiplexing," RAN2, RAN2 #104

[6] RP-182089, "New SID on Physical Layer Enhancements for NR Ultra-Reliable and Low Latency Communication (URLLC)," RAN #81.

[7] 3GPP TR 38.824, "Study on physical layer enhancements for NR ultra-reliable and low latency case (URLLC) (Rel-16)," v1.0.0

[8] 3GPP TS 38.300 v. 15.4.0 "NR; NR and NG-RAN Overall Description; Stage 2 (Release 15)"

[9] 3GPP TS 38.825

What is claimed is:

1. A method of receiving data by a communications device in a wireless communications network, the method comprising:
    receiving first downlink control information for scheduling one or more first downlink data blocks,
    receiving second downlink control information for scheduling one or more second downlink data blocks,
    receiving the one or more first downlink data blocks and the one or more second downlink data blocks,
    for each of the one or more first downlink data blocks and one or more second downlink data blocks determining an acknowledgement status, the acknowledgement status indicating whether the downlink data block was correctly received or not received correctly (ACK/NACK),
    receiving an indication of first uplink communications resources allocated for transmitting first acknowledgement information including the acknowledgement status for the one or more first downlink data blocks,
    determining that the first uplink communications resources are allocated for the transmission of acknowledgement information generated in accordance with a first codebook, the first codebook for generating acknowledgement information associated with the one or more first downlink data blocks,
    receiving an indication of second uplink communications resources allocated for transmitting second acknowledgement information including the acknowledgement status for the one or more second downlink data blocks,
    determining that the second uplink communications resources are allocated for the transmission of acknowledgement information generated in accordance with a second codebook, the second codebook for generating acknowledgement information associated with the one or more second data blocks,
    determining that the communications device is not capable of transmitting acknowledgement information using the first uplink communications resources and acknowledgement information using the second uplink communications resources,
    determining that a priority for transmitting acknowledgement information using the second communications resources is higher than a priority for transmitting acknowledgement information using the first communications resources, and
    in response to determining that the priority for transmitting acknowledgement information using the second communications resources is higher than the priority for transmitting acknowledgement information using the first communications resources, transmitting acknowledgement information using the second uplink communications resources, the transmitted acknowledgement information comprising an acknowledgement status indication representing the acknowledgement status of the one or more second downlink data blocks, and not transmitting acknowledgement information using the first communications resources.

2. The method according to claim 1, comprising:

in response to determining that the priority for transmitting acknowledgement information using the second communications resources is higher than the priority for transmitting acknowledgement information using the first communications resources, selecting a first number of the one or more first downlink data blocks, wherein the transmitted acknowledgement information comprises a second number of acknowledgement status indications based on an acknowledgement status associated with each of the selected first number of first downlink data blocks.

3. The method according to claim 2, wherein determining the first number comprises determining a number of the first data blocks whose acknowledgement status would have been indicated via acknowledgement information transmitted using the first uplink communications resources in the absence of the allocation of the second uplink communications resources.

4. The method according to claim 2, wherein determining the second number comprises determining a number of acknowledgement status indications that would have been included in acknowledgement information transmitted using the first communications resources in the absence of the allocation of the second uplink communications resources.

5. The method according to claim 2, the method comprising:

determining a number of acknowledgement status indications that can be included in acknowledgement information transmitted using the second uplink communications resources, and determining one or more of the first number and the second number based on the number of acknowledgement status indications that can be included in the acknowledgement information transmitted using the second uplink communications resources.

6. The method according to claim 2, wherein the second number is one and wherein the acknowledgement status indication based on the acknowledgement status associated with each of the selected first number of first downlink data blocks comprises an indication of whether all of the selected first downlink data blocks have been correctly received.

7. The method according to claim 2, wherein the first number is equal to the second number, and the transmitted acknowledgement information comprises an acknowledgement status indication for each of the selected first downlink data blocks.

8. The method according to claim 1, wherein the transmitted acknowledgement information does not include any acknowledgement status indication based on an acknowledgement status associated with a first downlink data block.

9. The method according to claim 1, wherein determining that the priority for transmitting acknowledgement information using the second communications resources is higher than the priority for transmitting acknowledgement information using the first communications resources comprises determining that the second codebook has a higher priority than the first codebook.

10. The method according to claim 9, wherein determining that the second codebook has a higher priority than the first codebook comprises:

determining a first priority associated with the first codebook, and determining a second priority associated with the second codebook.

11. The method according to claim 9, wherein a codebook index of the second codebook is lower than a codebook index of the first codebook.

12. The method according to claim 1, wherein the first downlink control information comprises an indication of the first codebook, and the second downlink control information comprises an indication of the second codebook.

13. The method according to claim 1, wherein the first downlink control information comprises the indication of the first uplink communications resources, the first uplink communications resources being associated with a first priority, the second downlink control information comprises the indication of the second uplink communications resources, the second uplink communications resources being associated with a second priority, and determining that the priority for transmitting acknowledgement information using the second communications resources is higher than the priority for transmitting acknowledgement information using the first communications resources comprises determining that the second priority associated with the second uplink communications resources is higher than the first priority associated with the first uplink communications resources.

14. The method according to claim 1, wherein the first downlink data block is associated with a first data type, the second downlink data block is associated with a second data type, and determining that the priority for transmitting acknowledgement information using the second communications resources is higher than the priority for transmitting acknowledgement information using the first communications resources comprises determining that the second data type is associated with a priority higher than a priority associated with the first data type.

15. The method according to claim 1, wherein determining that the communications device is not capable of transmitting acknowledgement information using both the first uplink communications resources and the second uplink communications resources comprises determining that the first uplink communications resources and the second uplink communications resources overlap in time.

16. The method according to claim 1, wherein the first codebook and the second codebook include at least one of a number of bits of acknowledgement information, a number of data blocks to be acknowledged, or a time duration during which the acknowledgement information is to be transmitted.

17. A method of transmitting data by an infrastructure equipment to a communications device in a wireless communications network, the method comprising:

transmitting first downlink control information for scheduling one or more first downlink data blocks, transmitting second downlink control information for scheduling one or more second downlink data blocks, transmitting the one or more first downlink data blocks and the one or more second downlink data blocks, transmitting an indication of first uplink communications resources allocated for transmitting by the communications device first acknowledgement information including the acknowledgement status for the one or more first downlink data blocks, determining that the first uplink communications resources are allocated for the transmission of acknowledgement information generated in accordance with a first codebook, the first codebook for generating acknowledgement information associated with the one or more first downlink data blocks, transmitting an indication of second uplink communications resources allocated for transmitting by the communications device second acknowledgement information including the acknowledgement status for the one or more second downlink data blocks, determining that the second uplink communications resources are allocated for the transmission of acknowledgement information generated in accordance with a second codebook, the second codebook for generating acknowledgement information associated with the second data blocks, receiving acknowledgement information transmitted using the second uplink communications resources, determining that the communications device is not capable of transmitting acknowledgement information using the first uplink communications resources and acknowledgement information using the second uplink communications resources, determining that a priority for transmitting by the communications device acknowledgement information using the second communications resources is higher than a priority for transmitting the communications device acknowledgement information using the first communications resources, in response to determining that the priority for transmitting by the communications device acknowledgement information using the second communications resources is higher than the priority for transmitting the communications device acknowledgement information using the first communications resources, determining that the received acknowledgement information comprises one or more acknowledgement status indications representing an acknowledgement status for the one or more second downlink data blocks, and based on the received acknowledgement information, for each of the one or more second downlink data blocks, determining an acknowledgement status indicating whether the downlink data block was correctly received by the communications device.

18. The method according to claim 17, comprising:
in response to determining that the priority for transmitting by the communications device acknowledgement information using the second communications resources is higher than the priority for transmitting the communications device acknowledgement information using the first communications resources, determining that the received acknowledgement information comprises one or more acknowledgement status indications representing an acknowledgement status for one or more of the first downlink data blocks, and based on the received acknowledgement information, determining for each of the one or more of the first downlink data blocks an acknowledgement status.

19. The method according to claim 17, comprising:
based on the determined acknowledgement status of one of the second downlink data blocks, determining to retransmit the one of the second downlink data blocks.

20. A method of transmitting data to a communications device in a wireless communications network, the method comprising:

transmitting first downlink control information for scheduling a first downlink data block, transmitting second downlink control information for scheduling a second downlink data block, transmitting the first downlink data block using communications resources identified in the first downlink control information and associated with a first process of a repeat request protocol, transmitting a second downlink data block using communications resources identified in the first downlink control information and associated with a second process of a repeat request protocol, determining first uplink communications resources allocated in accordance with the first process of a repeat request protocol for transmitting by the communications device first acknowledgement information including the acknowledgement status for the first downlink data block, determining that the first uplink communications resources are allocated for the transmission of acknowledgement information generated in accordance with a first codebook, the first codebook for generating acknowledgement information associated with the first downlink data block, determining second uplink communications resources allocated in accordance with the second process of a repeat request protocol for transmitting by the communications device second acknowledgement information including the acknowledgement status for the second downlink data block, determining that the second uplink communications resources are allocated for the transmission of acknowledgement information generated in accordance with a second codebook, the second codebook for generating acknowledgement information associated with the second data block, determining that the communications device is not capable of transmitting acknowledgement information using the first uplink communications resources and acknowledgement information using the second uplink communications resources, determining that a priority for transmitting acknowledgement information using the second communications resources is higher than a priority for transmitting acknowledgement information using the first communications resources, in response to determining that the priority for transmitting acknowledgement information using the second communications resources is higher than the priority for transmitting acknowledgement information using the first communications resources, transmitting an initial transmission of a third downlink data block, the third downlink data block transmitted using next communications resources associated with the first process of the repeat request protocol, wherein no acknowledgement information is received which is transmitted by the communications device using the first uplink communications resources.

\* \* \* \* \*